(12) United States Patent
Guha et al.

(10) Patent No.: US 11,727,129 B2
(45) Date of Patent: *Aug. 15, 2023

(54) DATA SECURITY USING SEMANTIC SERVICES

(71) Applicant: TADA Cognitive Solutions, LLC, Peoria, IL (US)

(72) Inventors: Seshadri Guha, Peoria, IL (US); Vinay Sikka, Peoria, IL (US); Subbarao Turlapati, Peoria, IL (US)

(73) Assignee: TADA Cognitive Solutions, LLC, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,738

(22) Filed: Apr. 8, 2022

(65) Prior Publication Data

US 2022/0300629 A1    Sep. 22, 2022

Related U.S. Application Data

(63) Continuation of application No. 16/544,702, filed on Aug. 19, 2019, now Pat. No. 11,301,573.

(51) Int. Cl.
    *G06F 21/62* (2013.01)
    *G06F 3/0482* (2013.01)
    *G06F 16/22* (2019.01)
    *G06F 9/451* (2018.01)

(52) U.S. Cl.
    CPC ............ *G06F 21/62* (2013.01); *G06F 3/0482* (2013.01); *G06F 9/451* (2018.02); *G06F 16/22* (2019.01)

(58) Field of Classification Search
    CPC .................................................... G06F 21/62
    See application file for complete search history.

(56) References Cited

U.S. PATENT DOCUMENTS 8,332,526 B2   12/2012   Kruse et al.
9,038,082 B2    5/2015   Maes
(Continued)

OTHER PUBLICATIONS

International Searching Authority, International Search Repod and Written Opinion, PCT/US2020/035104, dated Aug. 27, 2020, 7 pages.

(Continued)

*Primary Examiner* — Roland J Casillas
(74) *Attorney, Agent, or Firm* — Lee Sullivan Shea & Smith LLP

(57) ABSTRACT

Disclosed herein is a process that involves receiving an indication of an instance of a semantic network, the semantic network comprising conceptual data components and associative data components, receiving a selection of one or more of the conceptual data components and associative data components of the instance of the semantic network, the selection comprising an indication to block the selected one or more conceptual data components and associative data components or selectively filter the selected one or more conceptual data components and associative data components, and presenting a visualization of the semantic network, the visualization being configured to exclude data related to the selected one or more conceptual data components and associative data components or include data related to the selected one or more conceptual data components and associative data components and exclude data not related to the selected one or more conceptual data components and associative data components.

20 Claims, 12 Drawing Sheets

(56) References Cited

U.S. PATENT DOCUMENTS

| | | | |
|---|---|---|---|
| 9,258,195 B1* | 2/2016 | Pendleton | H04L 67/75 |
| 2013/0117060 A1* | 5/2013 | Henriksen | G06Q 10/06 |
| | | | 705/7.21 |
| 2013/0332378 A1 | 12/2013 | Brown et al. | |
| 2016/0028808 A1 | 1/2016 | Arthursson et al. | |
| 2020/0174980 A1 | 6/2020 | Hughes | |
| 2020/0175181 A1 | 6/2020 | Hughes | |

OTHER PUBLICATIONS

Tada Beyond data, "Building with Tada—Tada Cognitive Solutions", https://tada.zendesk.com/hc/en-us/categories/360000658454-Building-with-Tada, retrieved from the Internet Oct. 30, 2020, 4 pages.

Tada Beyond data, "Getting Started—Tada Cognitive Solutions", https://tada.zendesk.com/hc/en-us/categories/360000306154-Getting-Started, retrieved from the Internet Oct. 30, 2020, 20 pages.

Tada Beyond data, "The Tada App—Tada Cognitive Solutions", https://tada.zendesk.com/hc/en-us/categories/360001618714-The-Tada-App, retrieved from the Internet Oct. 30, 2020, 60 pages.

"Introduction to Tada—Tada Cognitive Solutions", https://vimeo.com/21082865, Uploaded Thursday, Mar. 30, 2017 at 3:38 PM EST via Parallel Uploader.

"Hello, we're Tada!—Tada Cognitive Solutions", https://vimeo.com/237788154, Uploaded circa 2017.

"Tada Suite Tutorial—Tada Cognitive Solutions", https://www.youtube.com/watch?v=_xQp-j3Rbog, Uploaded Jan. 21, 2020.

\* cited by examiner

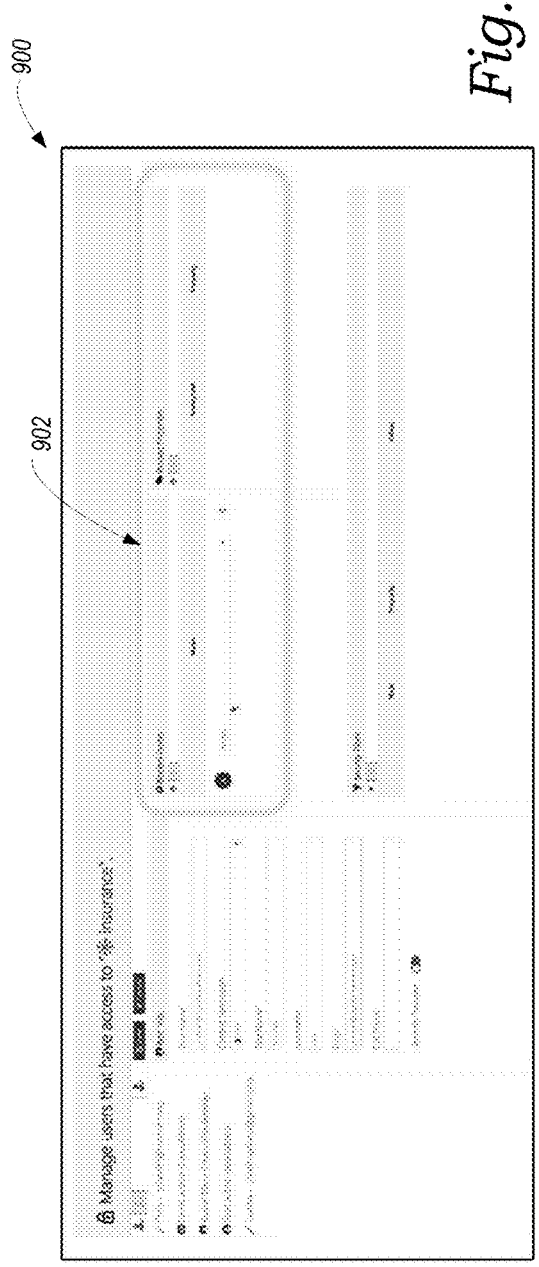
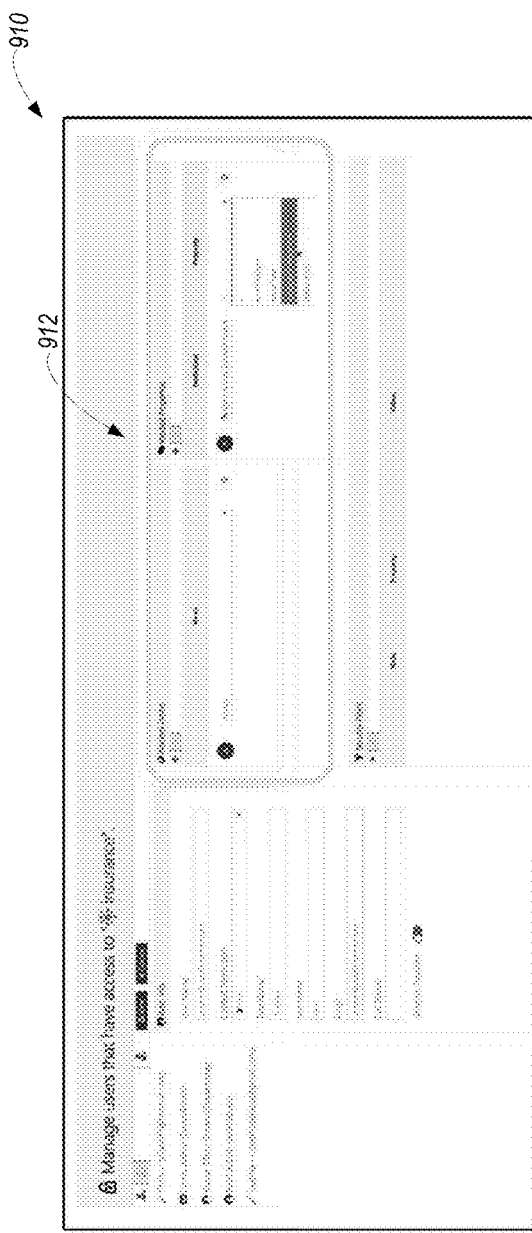
Fig. 9A
Fig. 9B

DATA SECURITY USING SEMANTIC SERVICES

CROSS-REFERENCE TO RELATED APPLICATION

This application is a continuation of, and claims the benefit of priority under 35 U.S.C. § 120 to, U.S. patent application Ser. No. 16/544,702, filed Aug. 19, 2019 and entitled "Data Security Using Semantic Services," which is incorporated by reference herein in its entirety. The contents of commonly-owned U.S. application Ser. No. 16/425,886, filed on May 29, 2019 and titled "Digital Duplicate" are hereby incorporated by reference herein for all purposes.

BACKGROUND

Businesses and other networks have a fundamental need to derive an understanding of their business/network at any moment in time, in order to engage in strategic & operational decision-making.

Overview

Today, this need to understand your business is served by a range of conventional systems for storing, manipulating, and accessing data. Such systems are generally limited in their scope, flexibility, and ability to integrate with other such systems that exist within a business or across multiple businesses.

Part of this limitation arises from these conventional systems for storing, manipulating, and accessing data being built around specific business functions. As examples, such systems may include a CRM tool, inventory management system, accounting system, enterprise resource planning, payroll tool, among other examples. These systems further suffer from being confined to engaging in specific user functions (e.g., report generation and visualization, data input, etc.) that are associated with those business functions.

Further, "data warehousing" and "business intelligence" systems tend to consume data originating from various sources in a data network, and aggregate and pre-process that data to fit a predefined schema or set of dimensions. As a tool, data warehousing is rigid by virtue of the fact that the dimensions, metrics, aggregation, and delivery models (e.g., dashboards) for the data must be pre-defined prior to utilization. In addition, the data contained within such systems may also be used for the specialized simulation and modeling of specific (narrow) areas of the business (e.g., supply chain modeling, manufacturing planning, financial modeling & forecasting, etc.).

Conventional systems—such as relational databases—are advantageous for vertical scaling (e.g., expanding a data table of 22 columns to billions of records), but tend to be rather limited in terms of horizontal linking and expansion across multiple tables.

In order to address these shortcomings, and to help improve upon these and other problems, the present disclosure seeks to reduce fixed relationships between data tables through the disclosed digital duplicate data structure, which utilizes a dynamic model and method that can be implemented through a plurality of techniques including dynamic entity relationships. This allows for the digital duplicate to ingest information, access data, and adapt to an organization's changes without the burden of redesigning the data system from the ground up, as may be required in conventional data structures and conventional approaches for implementing data storage systems and data structures.

From a user standpoint, conventional data structures and conventional approaches for implementing data storage systems may allow for data to be accessed in response to specific queries as permitted by the foundational design of database structures (e.g., based on requirements analysis and design, as used to design a relational database system). One drawback to this approach, however, is that in order to obtain a desired output from the data storage system (e.g., to obtain a desired query result), the user must have a priori knowledge of the architecture of the data storage system, including an understanding of the data structures utilized in the data storage system. With the approach disclosed herein, there are no such constraints. Indeed, the digital duplicate may replicate the real-world physical reality of the existence of associations between digital records (data) describing physical assets, events and other phenomena, and as such may be configured to provide to users desired outputs without requiring those users to have a priori knowledge of the data storage architecture.

In some respects, the disclosed approaches for establishing new data structures provide other advantages and efficiencies. As one example, relationships in the new data structures can be established using minimal additional logic. Further, data ingestion occurring from multiple data sources can, with the benefit of the present approach for establishing new data structures, result in data that is efficiently synthesized and arranged in the established data structure, helping to ensure it is consistent across an organization's entire data store. Additionally, once relationships between data are established, changes in any underlying data source (e.g., changes to the underlying data models or structure used by the data source) do not require changing the established relationships.

In one aspect, disclosed herein is a computer-implemented method that involves: receiving an indication of an instance of a semantic network, the semantic network comprising conceptual data components and associative data components, receiving a selection of one or more of the conceptual data components and associative data components of the instance of the semantic network, the selection comprising an indication to at least (i) block the selected one or more conceptual data components and associative data components or (ii) selectively filter the selected one or more conceptual data components and associative data components, and presenting a visualization of the semantic network, wherein the visualization is configured to (i) exclude data related to the selected one or more conceptual data components and associative data components or (ii) include data related to the selected one or more conceptual data components and associative data components and exclude data not related to the selected one or more conceptual data components and associative data components.

In another aspect, disclosed herein is a computing system that comprises at least one processor, a non-transitory computer-readable medium, and program instructions stored on the non-transitory computer-readable medium that are executable by the at least one processor to cause the computing system to carry out the operations disclosed herein, including but not limited to the operations of the foregoing method.

In yet another aspect, disclosed herein is a non-transitory computer-readable medium comprising program instructions that are executable to cause a computing system to carry out the operations disclosed herein, including but not limited to the operations of the foregoing method.

One of ordinary skill in the art will appreciate these as well as numerous other aspects in reading the following disclosure.

BRIEF DESCRIPTION OF THE DRAWINGS

FIG. 9A is an example output produced by a device executing one embodiment of a software tool according to the present disclosure.

FIG. 9B is an example output produced by a device executing one embodiment of a software tool according to the present disclosure.

DETAILED DESCRIPTION

Figure 1A:
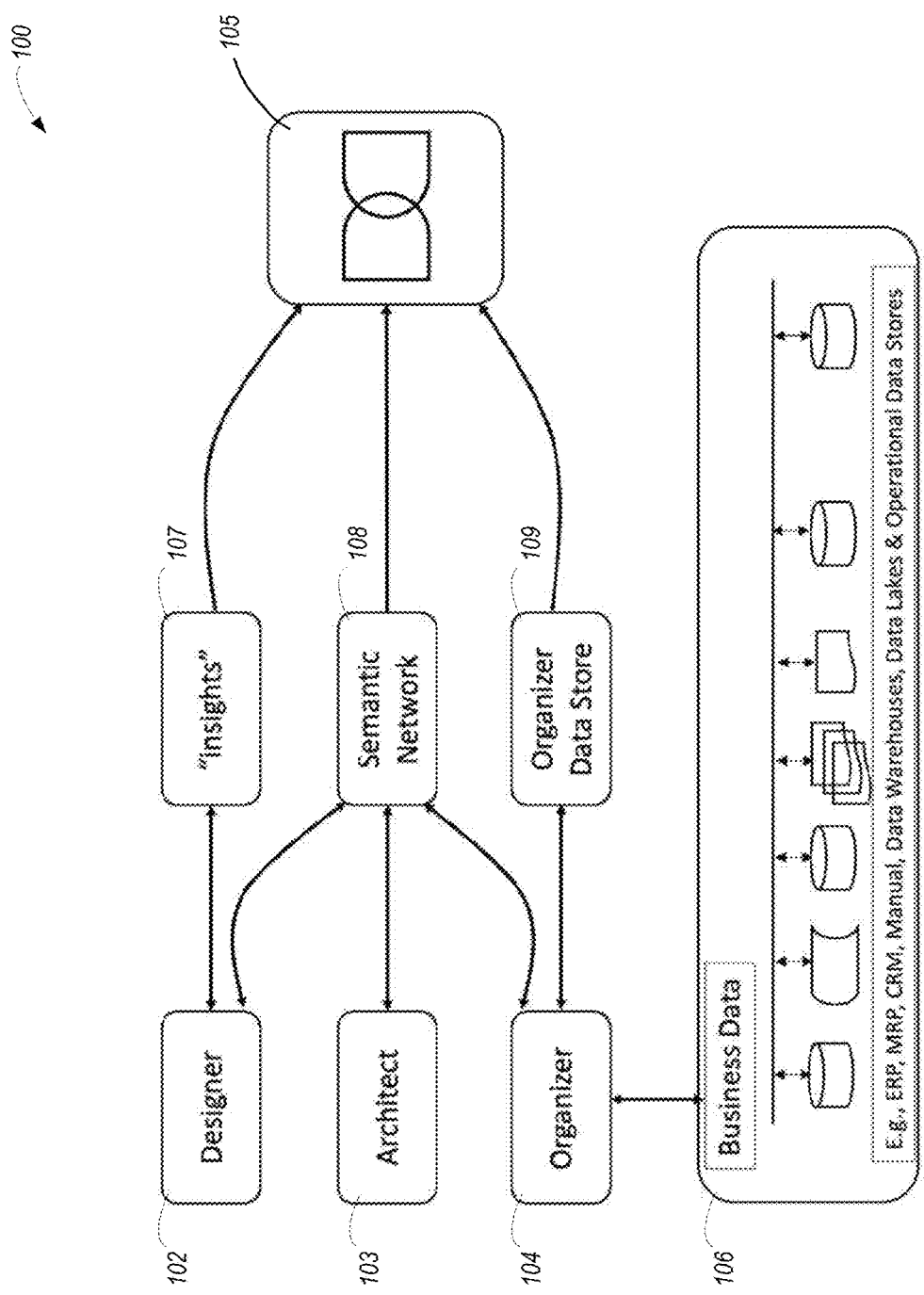
FIG. 1A depicts an example high-level functional arrangement in which example embodiments may be implemented.

The following disclosure references the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

The present disclosure is generally directed to technology for implementing data security operations in the context of semantic networks. In particular, a "digital duplicate" may utilize a semantic network that represents an organization's business operations offering a unique set of advantages over conventional systems. Specifically, by building a digital duplicate using a new data structure based on the neuro-synaptic model through which humans combine and use information in the brain, the digital duplicate may facilitate a more efficient and dynamic means of storing, retrieving, searching, securing, navigating, and synthesizing the data associated with the business or other network.

When the digital duplicate is populated with the data (embodied as digital content), the digital duplicate may allow for the data to be contextualized in a way that benefits from the efficiencies realized by human cognition. Furthermore, the data may originate from a plurality of sources (e.g., conventional data stores or warehouses) and may be unified and/or aggregated from those distributed sources into the context provided by the digital duplicate.

The disclosed system may be built in network-form, making large-scale multidimensional nodes, associations, and properties of many different data sources and types lightweight in comparison with conventional systems. Notably, conventional systems, such as the semantic web, do not provide for associations to be formed automatically based on semantic alignment between two or more pieces of data. As disclosed, the present architecture employs a semantic data type, among other properties and property types, which allows for associations to be formed between different data from their shared semantic context, automatically, without the association having to be programmed into the system (as it may otherwise be in existing systems, such as those that utilize "triplet" form, like OWL, RDF, etc.). Accordingly, the present disclosure provides a technique that invention allows for rules, logic and associations to be established and utilized around stored data without the need for programmatic logic.

In addition, the introduction of the semantic data type allows for semantically-identical information to be correlated even when different language is used by different users across a network or networks to describe that same information. This ability to correlate information by its semantics enables a wealth of novel functionality relating to data consumption, processing, association, manipulation and use, among others.

I. EXAMPLE SYSTEM ARCHITECTURE

Turning now to the figures, FIG. 1A depicts a high-level arrangement 100 of some of the functional components that may be involved in establishing, navigating through, and facilitating data security operations for a digital duplicate. In one example, three different tools may be used to establish and navigate through various parts of a digital duplicate 105, namely a designer tool 102, an architect tool 103, and an organizer tool 104, among other possible tools. At a high level, the architect tool 103 may be used to establish what is referred to herein as a "digital context," which can be thought of as the framework that replicates the language of a business. More particularly, but still by way of example, the architect tool 103 may be used to establish a "semantic network" 108 that relates the terminology and conceptual meanings behind the data collected and stored by an organization, such as various terms, metrics, key performance indicators, etc. that will be used within the digital replica of the business. As will be described further herein, the semantic network 108 may be a dynamic network of various data structures that are linked together, which replaces the typical relational data model of rows and columns contained within disparate databases, which provides cross-functional visibility. A semantic network 108 may comprise nodes, links, and properties that represent core-business elements, and is the foundation of the digital context.

A designer tool 102 may be used to introduce business logic into the semantic network by creating "insights" 107 that traverse the network through one or more "pathways." The insights 107 may then be used as a basis for information and visualizations provided to end users in one or more forms. The insights 107 may be created at the semantic level, and may thus be abstracted away from underlying source data 106.

An organizer tool 104 may be used to make a connection between the semantic network 108 and the organization's underlying data stores 106 (which, as depicted, may span across multiple disparate traditional databases or other data warehouses). This functionality may, in some embodiments, include functionality to link multiple data sources to the semantic network 108, as well as onboard the underlying data from the organization's underlying data stores 106 to the organizer data store 109 and ultimately into the semantic network 108 after filtering, cleaning, transforming, and/or validating the data as desired. These actions may serve to provide the system with what is referred to as "digital content," which together with the "digital context" form what is referred to as a "digital duplicate."

Another tool may be used to implement data security operations for semantic networks referred to as an admin tool. In particular, and as described further herein below, an admin tool may facilitate the creation of subsets of a semantic network such that visualizations of the subset of the semantic network restrict or hide portions of the semantic network not included in the subset. Additionally, the admin tool may facilitate establishing blocks and/or filters for a semantic network, such that visualizations of the semantic network either block selected portions of the semantic network and/or only show the selected portions of the semantic network. Such operations may be applicable when it is desired to present visualizations of the semantic network to particular users but restrict from these users view certain portions of the semantic network, including the underlying data (i.e., the digital content) assigned to the semantic network. As mentioned, this functionality may be embodied in an admin tool, which may in turn be embodied as a software tool configured to be executed by the example system architecture described further herein below.

Figure 1B:
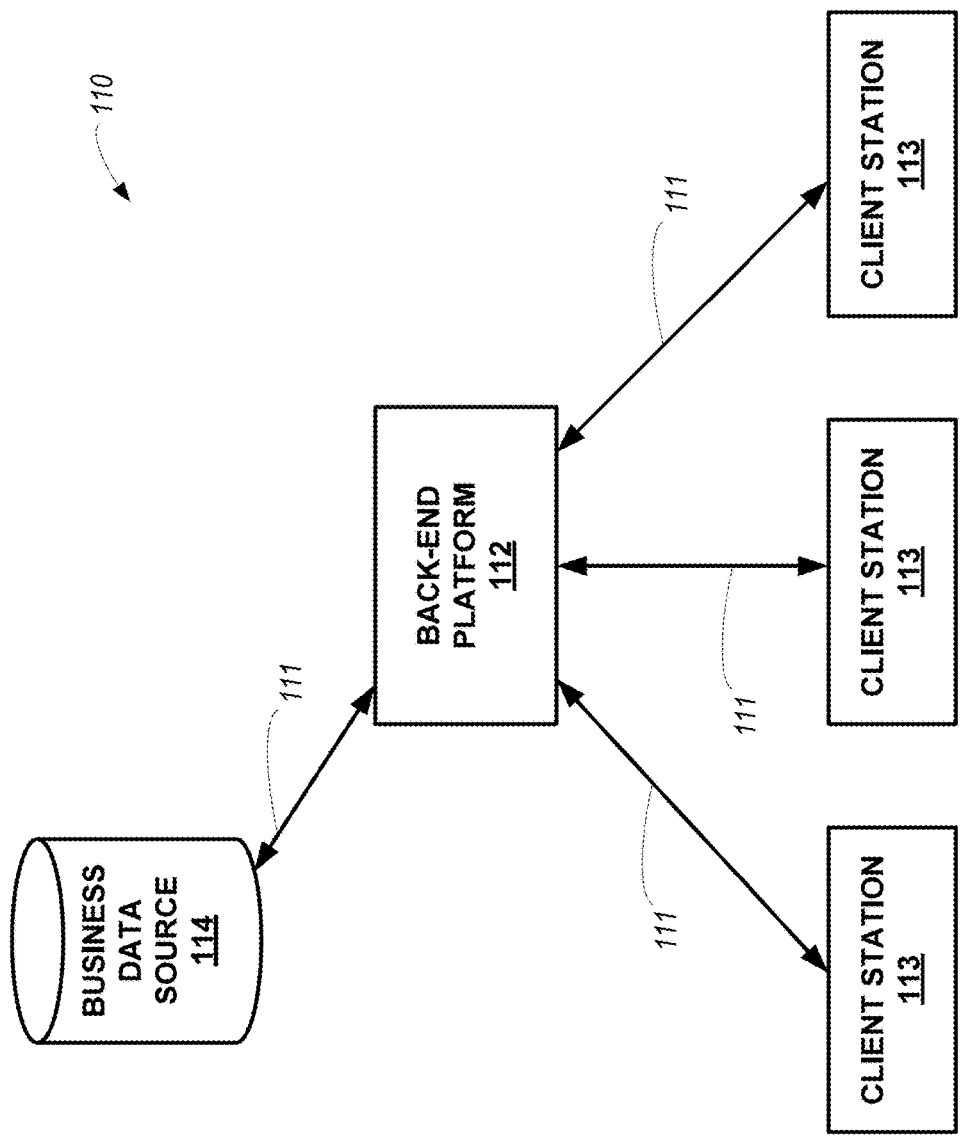
FIG. 1B depicts an example network architecture in which example embodiments may be implemented.

Turning now to FIG. 1B, depicted herein is an example network configuration 110 in which example embodiments of the present disclosure may be implemented. As shown in FIG. 1B, network configuration 110 includes a back-end platform 112 that may be communicatively coupled to one or more client stations, depicted here, for the sake of discussion, as client stations 113.

Broadly speaking, back-end platform 112 may comprise one or more computing systems that have been provisioned with software for carrying out one or more of the functions disclosed herein, including but not limited to establishing a digital context and ingesting data to form a digital duplicate. The one or more computing systems of back-end platform 112 may take various forms and be arranged in various manners.

For instance, as one possibility, back-end platform 112 may comprise a computing infrastructure of a public, private, and/or hybrid cloud (e.g., computing and/or storage clusters) that has been provisioned with software for carrying out one or more of the functions disclosed herein. In this respect, an entity that owns and operates back-end platform 112 may either supply its own cloud infrastructure or may obtain the cloud infrastructure from a third-party provider of "on demand" computing resources, such as Amazon Web Services (AWS) or the like. As another possibility, back-end platform 112 may comprise one or more dedicated servers that have been provisioned with software for carrying out one or more of the functions disclosed herein. Other implementations of back-end platform 112 are possible as well.

In turn, client stations 113 may each be any computing device that is capable of running the front-end software disclosed herein. In this respect, client stations 113 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 113 may each take the form of a desktop computer, a laptop, a netbook, a tablet, a smartphone, and/or a personal digital assistant (PDA), among other possibilities.

As further depicted in FIG. 1B, back-end platform 112 is configured to interact with client stations 113 over respective communication paths 111. In this respect, each communication path 111 between back-end platform 112 and one of client stations 113 may generally comprise one or more communication networks and/or communications links, which may take any of various forms. For instance, each respective communication path 111 with back-end platform 112 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 111 with back-end platform 112 may be wireless, wired, or some combination thereof, and may carry data according to any of various different communication protocols. Although not shown, the respective communication paths 111 between client stations 113 and back-end platform 112 may also include one or more intermediate systems. For example, it is possible that back-end platform 112 may communicate with a given client station 113 via one or more intermediary systems, such as a host server (not shown). Many other configurations are also possible.

The interaction between client stations 113 and back-end platform 112 may take various forms. As one possibility, client stations 113 may send certain user input related to a digital duplicate to back-end platform 112, which may in turn trigger back-end platform 112 to take one or more actions based on the user input. As another possibility, client stations 113 may send a request to back-end platform 112 for certain data and/or a certain front-end software module, and client stations 113 may then receive digital duplicate data (and perhaps related instructions) from back-end platform 112 in response to such a request. As yet another possibility, back-end platform 112 may be configured to "push" certain types of digital duplicate data to client stations 113, in which case client stations 113 may receive digital duplicate data (and perhaps related instructions) from back-end platform 112 in this manner. As still another possibility, back-end platform 112 may be configured to make certain types of digital duplicate data available via an API, a service, or the like, in which case client stations 113 may receive data from back-end platform 112 by accessing such an API or subscribing to such a service. The interaction between client stations 113 and back-end platform 112 may take various other forms as well.

As also shown in FIG. 1B, back-end platform 112 may also be configured to communicate with one or more data sources 114, such as external databases, internal databases, and/or another back-end platform or platforms. Such data sources—and the data output by such data sources—may take various forms. Further, back-end platform 112 and the one or more external data sources 114 may be configured to interact over a communication path 111, which may take the form or forms discussed above with respect to the other communication paths 111.

It should be understood that network configuration 110 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING DEVICE

Figure 2:
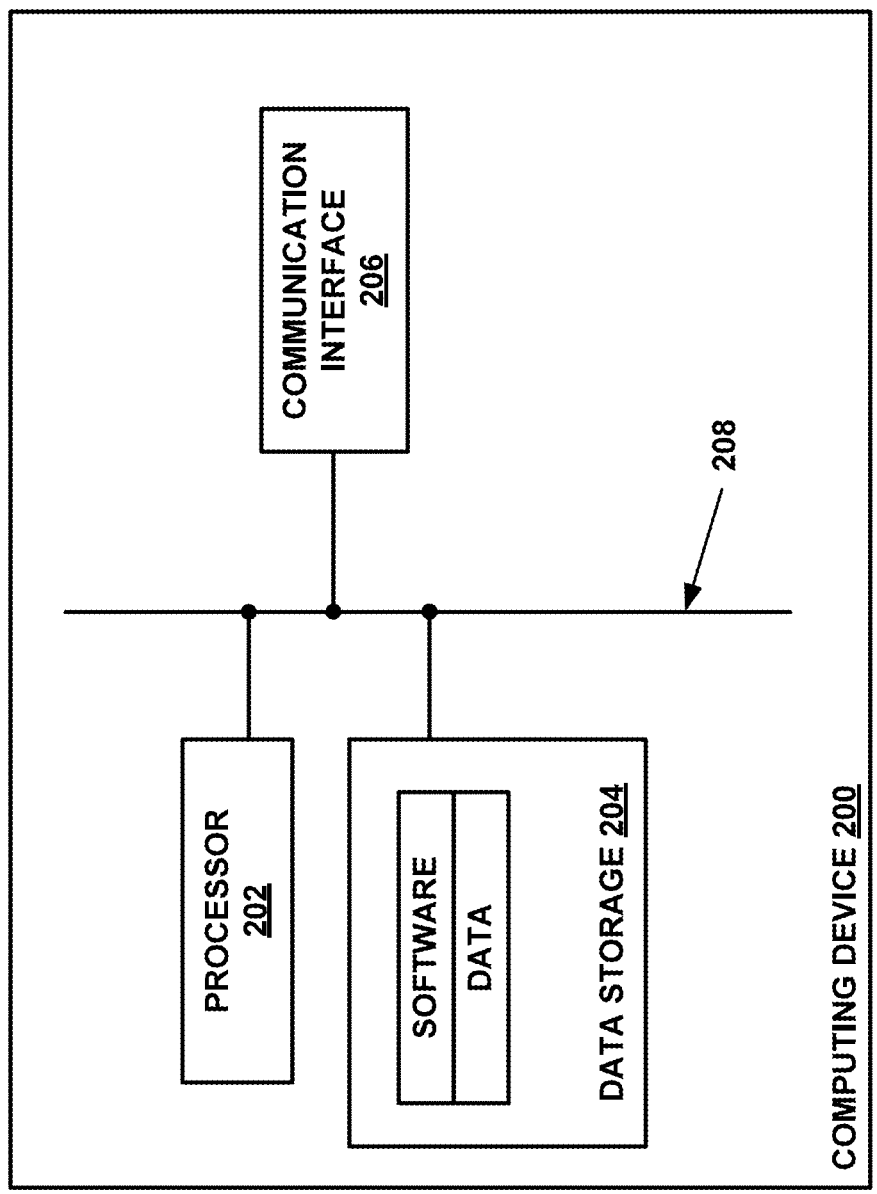
FIG. 2 depicts a simplified block diagram of an example computing device in which example embodiments may be implemented.

FIG. 2 is a simplified block diagram illustrating some structural components that may be included in an example computing device 200, which could serve as, for instance, the back-end platform 112 and/or one or more of client stations 113 in FIG. 1B. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store data in one or more databases, file systems, or the like. Data storage 204 may take other forms and/or store data in other manners as well.

Communication interface 206 may be configured to facilitate wireless and/or wired communication with other computing devices or systems, such as one or more client stations 113 when computing device 200 serves as back-end platform 112, or as back-end platform 112 when computing device 200 serves as one of client stations 113. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. DIGITAL DUPLICATE DATA STRUCTURES

As mentioned, the present disclosure is directed to a new approach for structuring an organization's, a business's, or a network's data as well as processes for implementing data security operations within this approach, all of which may help to facilitate more efficient access to this data. At a high level, this approach involves establishing a digital context and populating the digital context with digital content to thereby form what is referred to herein as a digital duplicate. Deploying a digital duplicate in practice includes the high-level steps of first creating the digital context, and second adding data to this digital context. The digital duplicate may be kept live or refreshed repeatedly over time by continuously updating the digital context as the organization's, business's, or network's data changes and the digital content as the data and the data sources change. While elements of the digital context and digital content may change, the core data structure of the digital duplicate does not typically change, allowing the information to remain consistent without having to change the design of the data structure.

Figure 3:
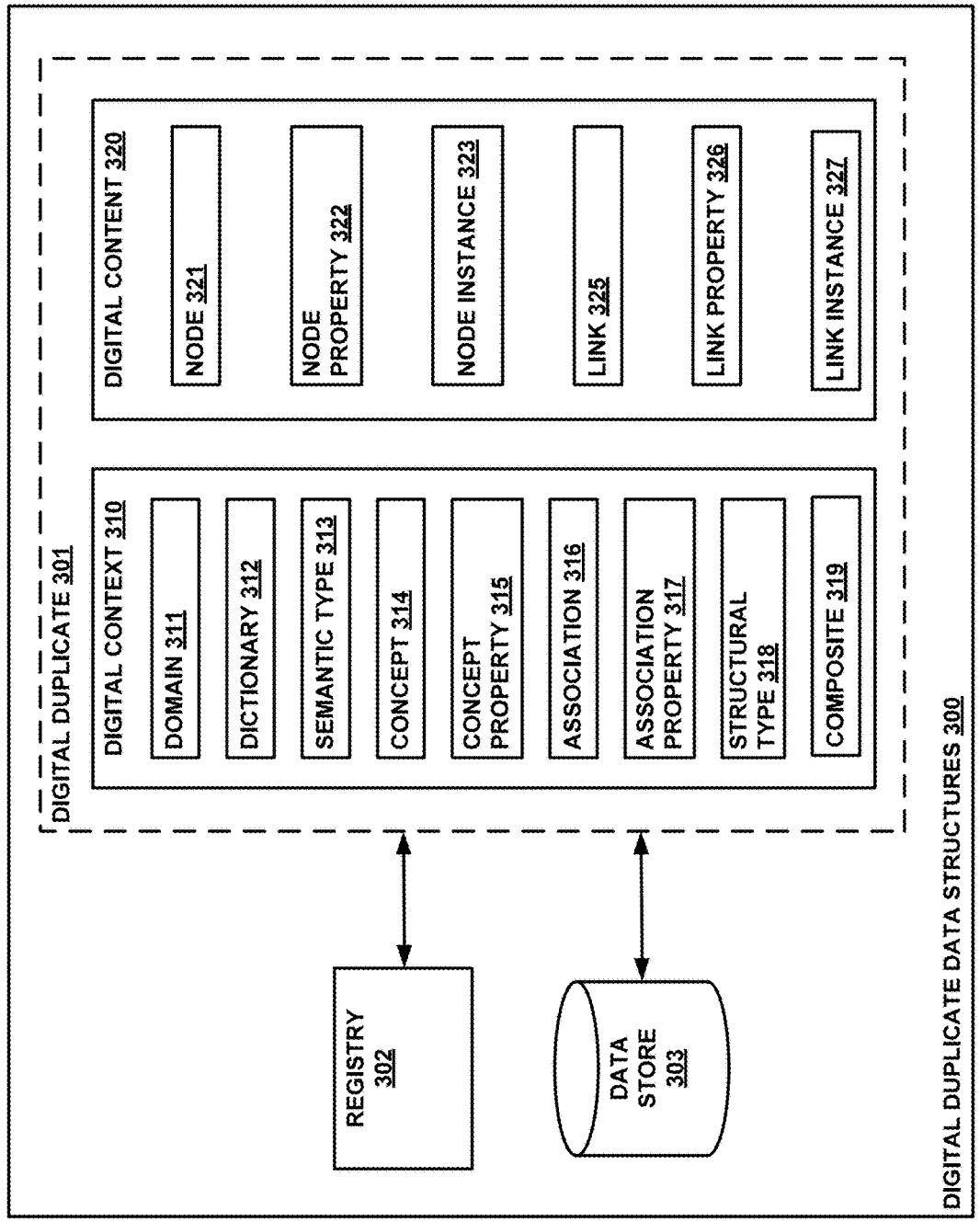
FIG. 3 depicts a simplified block diagram of some example data structures according to example embodiments.

FIG. 3 is a simplified block diagram, illustrating an example digital duplicate data structure architecture 300 according to an example embodiment of the present disclosure. At a high level, and as depicted, digital duplicate data structures 300 may include a digital context 310 and digital content 320, which together form what is referred to herein as an instance of a digital duplicate 301. The data structures 300 also include a registry 302 and a data store 303. These various data structures are described herein in further detail.

A. Digital Context

At a more specific level, but still by way of example, FIG. 3 depicts an example architecture diagram illustrating certain data structures included within digital context 310. As mentioned, digital context 310 is a data structure that generally comprises a network of individual data components. This network of data components may include structural context components and semantic context components. These components may be stored in data store as will be described further herein.

Turning first to the structural context components, these structural context components may generally describe how the data is structured and stored in the digital context. In one implementation, the structural context components may include conceptual components 314 (sometimes referred to herein as concepts) and associative components 316 (sometimes referred to herein as associations). And these components may have one or more respective properties 315, 317. These components may be designed to hold data that describes various aspects about how an organization's information is structured within the digital duplicate 301 as well as how this information relates to itself. Although these components are depicted as blocks in a simplified block diagram, it should be understood that the underlying data represented by these blocks may be stored in an appropriate storage location of data store 303, which may at time be referred to herein as a directory.

A conceptual component 314 may generally be a data structure that is designed to hold data that describes one aspect of an organization's business. To illustrate with an example for a particular organization in the medical services industry, one example conceptual component may be a "physician" component where this conceptual component may be designed to hold data that describes the physicians that are employed by the particular organization. To this end, the "physician" conceptual component may include various properties 315 for holding such data, including a "Last Name" property, a "First Name" property, a "Specialty" property, a "Telephone Number" property, and/or a "Years in Service" property, among other examples.

In some cases, properties may be shared across multiple conceptual components. For example, the "specialty" property may be shared across multiple "Physician" conceptual components and/or the "Clinic" conceptual component. In situations in which a property is widely shared across multiple conceptual components, the digital context may be configured to promote the "specialty" property from a property to a separate concept. This may be accomplished without changing the underlying data structure but rather reconfiguring it. This ability of the neuro-semantic network to adapt and learn as the organization changes makes it a scalable and learning model. The method provides for the ability to promote properties into concepts or to collapse them into concepts and associations to best represent the current structure of the organization.

Another example conceptual component 314 may be a "patient" component where this conceptual component may be designed to hold data that describes the individuals that are patients of the various physicians who are employed by the particular organization. To this end, the "patient" conceptual component may include various properties 315 for holding such data, including a "Last Name" property, a "First Name" property, a "Home Address" property, and/or a "preferred Payment Method" property, among other examples.

Yet another example conceptual component 314 may be a "clinic" component where this conceptual component may be designed to hold data that describes the various clinical facilities utilized by the particular organization. To this end, the "clinic" conceptual component may include various properties 315 for holding such data, including a "Clinic Name" property, an "Address" property, a "Services Offered" property, and/or a "Capacity" property, among other examples.

As depicted, another type of structural component of the digital context may be an associative component 316. An associative component is similar to a structural component in that it is designed to hold data that describes one aspect of an organization's business. But more specifically, the associative component is also designed to hold data that (i) describes an aspect of the organization's business such as an activity or a metric and (ii) relates together to two or more conceptual components 314. As an example, one example associative component for the particular organization in the medical services industry may be a "visit" component designed to hold data that describes a particular patient's visit to a particular physician at a particular clinic and is thus associative of multiple conceptual components, including the example "physician," "patient," and "clinic" structural components described above. To this end, the "visit" associative component may include various properties 317, including a "Date of Visit" property, a "Duration of Visit" property, "Billed Value of Visit," and/or a "Diagnosis of Visit" property, among other examples.

As mentioned throughout the examples given above, structural context components, including both conceptual components and associative components, include various properties 315, 317 for holding certain specific descriptive data for the structural context component. In some implementations, each individual property of a given structural context component may be described by a particular combination of a structural data type 318 and a semantic data type 313, which may thus form a semantic component.

Generally, a structural data type 318 applied to information is data that describes how the information is stored within the system. Many different structural data types are possible. As one example, a structural data type may take the form of a "temporal" data type, under which a "Years in Service" property may fall. As another example, a structural data type may take the form of a "spatial" data type, under which a "Clinic Address" property may fall. As another example, a structural data type may take the form of a "physical" data type, under which a "Clinic" and the "Clinic Name" property may fall. As another example, a structural data type may take the form of a "Personal" data type, under which a "Last Name" data type may fall. As another example, a structural data type may take the form of a "Quantitative" data type, under which a "Billed Value of Visit" property may fall. As another example, a structural data type may take the form of a "Categorical" data type, under which a "Specialty" property may fall. It should be appreciated that other examples may be possible as well.

Generally, a structural data type helps define how data is managed, indexed, and stored for all similar properties in the network. Properties with common structural data type may use common data structures to store and retrieve data across a digital duplicate and provide an efficient way to store, access and relate data; allowing for unique computations; and provide better methods to access, resolve and compare similar data. For example, all "temporal" data types may share or "index" to a common timeline data structure that allows independent events like a sale event and a marketing discount that happened during the same month without having to explicitly compare data. This provides an ability to not only perform unique computations and analysis on properties with similar structural data like "same month," or "same quarter," but also compare financial results of two unrelated companies for the same quarter even though they belong to different business networks because they use the same temporal data type. In another case, if two separate networks provide the population and economic data for the same spatial data type (such as a zip code), it allows one to overlay and contrast population and GDP for the same zip code with minimal effort. Multiple similar storage and advantages can be added to across all shared structural data types by creating a shared structural data type and storage model across properties in a network.

Structural data types like "temporal," "spatial," "personal," or "organizational" may allow data and methods to be shared across one or more properties in a network or across whole networks using a common data structure like a shared timeline, time resolution, or temporal methods; while semantic data types (discussed below) allows for data and methods to be shared across a network using common meaning. Shared structural data types may also have shared resolution and absolute values. For instance, "February 2015" will have a resolution of 1 day and may be a delivery date to a customer or the start date of an employee. This allows shared computations like "Start Month" or "Delivery Month" to be performed.

As also indicated, each property may also have a semantic data type 313. Generally, a semantic data type applied to underlying information is data that describes what the information means. A semantic data type may have various aspects that facilitate describing what the information means. One aspect that a semantic data type may have is called a primitive data type. A primitive data type may describe the general form of the information. Example primitive data types may include "integer," "Boolean," "string," "float," etc. Another aspect that a semantic data type may have is a pointer that points to a particular function that may be associated with the information. This pointer may be stored in the dictionary entry 312 for the particular semantic data type and may point to various kinds functionality. As one example, the pointer may point to a web method for utilizing the underlying information. A web method may be any operation or set of operations embodied in a web service, API, or the like. For instance, one web method may be a "mailto:EmailAddress" web method that refers to a web method that causes an email client to be invoked, generate a new email message, and populate the "To:" field with the email address represented by the data variable "EmailAddress." Other web methods are possible as well.

Another example of a function to which a pointer may point is mathematical operation performed using the underlying information represented by the semantic data type. For instance, one type of mathematical operation for a "date of birth" semantic data type may be an age computation function. With such a function, the system may compute the age of an individual represented by the underlying date of birth information by, for instance subtracting the "date of birth" date from "current date" data to arrive at "age" data.

Another type of mathematical function for a "price per unit" semantic data type may be a total price aggregation function. With such a function, the system may aggregate all of the data values from various "price per unit" data types to arrive a total price value. Such a function may be useful in situations where a customer is purchasing products or services in a single order that stems from two or more aspects of a business, which may not have aggregated their data systems in advance. Applying the "price per unit" semantic data type (or, in other examples, a similar-functioning semantic data type) serves to link the pricing across what may be disparate aspects of the organization and/or disparate data systems.

Another type of mathematical function for a "lead time" semantic data type may be a lead time aggregation function. A "lead time" semantic data type may be associated with a product, component of a product, subassembly, construction project, etc. With such a function, when a customer purchases multiple products at once, an aggregation function may be executed in which the system may automatically populate "lead time" data by selecting the individual lead time field for each of the purchased products that has the greatest lead time value. In cases in which a product may not have a lead time associated with it, the lead time of each subassembly or component that makes up the product may by summed to approximate the total lead time of the product.

In one example, during data ingestion, the system may capture various data fields for an order, including a "deliveryDate" field for describing the delivery date of an order, an "orderDate" field for describing the date of the placement of the order, and a "deliveryTime" field for describing the time taken for the order to be fulfilled after the product is fully manufactured and stocked in inventory, all of which may be specified by various a logistics or fulfillment systems. At this stage, the system may compute the actual lead time of the product to be the function of (deliveryDate−orderDate)−deliveryTime. Therefore, in the case where a product is not built before it is ordered (as is common in the heavy equipment industry, for example) lead time may be a residual value, as calculated above. Once lead time is known, the system may then engage in a function that compares the actual lead time with the approximated lead time, which may be made possible by the existence the "lead time" semantic data type being used across multiple business systems that is semantically distinct from a "delivery time" type. A further function may add an "error" to the function for computation of approximated lead times for all other products, which in turn may propagate the new calculation of approximated lead times throughout the digital duplicate instantaneously. In this way, the system may engage in a kind of machine learning.

Another example of a function to which a pointer may point is a linking function that may operate to link two or more semantic data types together and form a new property of an associative structural component. As one example of this, a distance function may link together an "address" property of a "patient" conceptual component and an "address" property of a "clinic" conceptual component and computes the distance between these two addresses. The function may then save this distance as a new property of a new associative component.

Yet another example of a function to which a pointer may point is a semantic search function. With such a function, a search may be executed on a given semantic data type, which may retrieve data of the same semantic type from other areas of the organization or other network.

To help illustrate, consider an example in which respective digital duplicates have been established for different aspects of an organization. Each such digital duplicate will have its own set of data components stored separately from the data components of the other digital duplicates. In a situation in which a user desires to know all employees that share duties or interact across the organization's departments, a semantic query can be issued on an "Employee" semantic data type. In the context of the present disclosure, such a semantic search may return all data objects that are based on this semantic type, regardless of the content, format, or location of the data. In this way, the semantic search unifies various disconnected digital representations. With conventional approaches, by contrast, a typical search would fail here, because the data may be spread out across multiple different databases and arranged in multiple tables; and as such, any query would need to account for these multiple databases and the various tables.

Considering another example, say a user desires to know all entities (e.g., dealers, customers, vendors, employees, etc.) having a specific area code. In the context of the present disclosure, the user could issue a single query on a "Phone No." data type for the specific area code of interest. Such a query would return all data objects having the specific area code of interest no matter the location or format of the data. By contrast, with a conventional approach, a user may need a deep understanding of the organization's data storage structure in order to carry out this query. For instance, the user may need to know what table the employee records are stored in and what field and what format the phone number data is stored in. Likewise, the user may need to know this same information for the dealer records, the customer records, the vendor records, etc. Each additional storage location may add complexity to the query. And to the extent that the data is stored in disparate data stores (such as one data warehouse for employee records and another data warehouse for vendor records), then the user may need to issue separate queries for each such disparate data source further compounding the complexity and vulnerability for user error. Thus, with the benefit of the present disclosure, it should be understood how the semantic data type provides for more efficient data retrieval, among other advantages.

In some embodiments, user interface elements presented by one or more computing devices disclosed herein (e.g., client stations 113) may reflect semantic data types with specific graphical elements, such as icons. As one example, on a user interface that is displaying multiple semantic data types for an organization, the user interface may display a telephone icon adjacent to data that is of a "phone number" semantic data type, and/or a map icon if the data is of an "address" semantic data type, although other examples are possible. It should be understood that the functions disclosed herein are merely examples, and that in other implementations, other functions may be possible as well.

Depending on the organization, semantic data types can be arranged into various semantic groups. A semantic group is generally a set of one or more semantic data types that are relevant to a particular categorical aspect of the organization. For instance, example semantic groups for an organization may be "Financial & Accounting," "Production & Manufacturing," "Purchasing," and/or "Logistics." In this way, an organization may arrange the semantic data types into groups that are reflective of the organization's operating departments or sectors. Thus, the "Financial & Accounting," semantic group may have semantic data types that refer to aspects of the organization's own financial & accounting department, the "Production & Manufacturing," semantic group may have semantic data types that refer to the aspects of the organization's own production and manufacturing operations, etc. As such, these semantic data types may more accurately describe the organization's own business operations and may thus be more useful to the organization.

Semantic data types may provide various advantages to organizations who utilize the digital duplicate schema set forth in FIG. 3 and generally described herein. As one advantage, the semantic data type 313 may serve to discriminate between (i) human language used to describe an aspect of the organization's operations (which can be stored as the name of a property, in one embodiment) and (ii) the underlying meaning of the human language used to describe the aspect of the organization's operations (which can be stored as the semantic data type, in one embodiment). This discrimination may thus allow for properties in the digital duplicate to be unified by their underlying meaning (i.e., unified by their semantic data type) even when the human language used to describe them (i.e., their property names) may not be the same.

More particularly, but still by way of example, the digital duplicate architecture 300 encourages this unification by having data sets that are consistently accurate and complete because no data is mismatched within a given context. To illustrate, if one property is called "Digits," and another property is called "Phone No." but these properties refer to the same thing, they both may be pulled into a report, a visualization, a computation, or used in some other way by the computing system when the digital duplicate calls for the semantic data type 'Telephone Number' within a given context. This may be accomplished through an arrangement where "Telephone Number" is a semantic data type that is shared by both the "Digits" and "Phone No." properties. In this way, the semantic data type may be said to "unify" two (or more) properties by these properties' underlying meanings.

Unification may also allow for functions to be associated with different properties of the same semantic data type. To illustrate, as indicated above, "Digits" and "Phone No." may be two different properties that share the same semantic data type "Telephone Number." Therefore, both "Digits" and "Phone No." may have a pointer that points to a "Make-Call" function, which is assigned to these properties by virtue of their shared semantic data type.

Unification may also occur by enriching the structural context of the digital duplicate as a result of automating through-computation of additional properties based on the semantic data type(s) of the original properties and the functions available for the semantic data type(s). To illustrate using the example from above, the function for computing "Age" from the "Date of Birth" semantic data type is a form of unification because "Birth Date" and "Date of Birth" may be distinct properties in the digital duplicate but share the same semantic data type: "Date of Birth." Other examples of how the digital duplicate architecture results in unification are possible as well. The combination of the concept (node) or association (link) that describes a property in combination with a semantic data type (and in many cases a structural data type) individually and combined also create a strong representation of the digital context. When combined, they provide not only a simple way to locate every piece of data in the business network, and to locate a relative position of the data to other pieces of data for navigation and comparison, but also may provide meaning to the data and structure for storage. Once combined, these data structures create ways to simply and efficiently create, manage, and navigate data in a business or network using the digital context.

As also depicted in FIG. 3, digital context 310 may contain a composite structure 319. A composite structure 319 may contain one or more indications of sets of concepts and associations that represent various aspects of an organization. One type of composite structure may be a layer of concepts and associations. The concepts and associations that comprise a layer may represent similar aspects of the organization. In one example, an organization in the medical services industry may have a "pharmaceutical" layer that comprises concepts and associations related to any pharmaceutical aspects of the organization, such as pharmacy employees, pharmacy inventories, and/or an employee layer that comprises concepts and associations related to employees across all departments. Another type of composite structure may be a realm of concepts and associations. The concepts and associations that comprise a realm may represent aspects of the organization that are grouped on a broader level. For instance, a large organization that is made up of or owns several smaller businesses may have a realm that comprises all the concepts and associations for one entire business and a realm that comprises all the concepts and associations for another entire business. Yet another type of composite structure may be an insight. The concepts and associations that comprise an insight may represent collections of concepts and insights that have been automatically identified by the system as having some threshold number of relationships. The system may identify such insights when certain patterns develop in the organization's digital context (e.g., a threshold number of associations between various concepts, and/or a threshold number of shared properties between multiple concepts or associations), and in this may be identify to users unique aspects of the organization's operations. Other examples of layers, realms, and insights are possible as are other types of composite structures.

B. Digital Content

As also depicted in FIG. 3, the digital duplicate 301 includes digital content 320. Generally, digital content 320 is the underlying data that populates one or more instances of the framework for the digital duplicate (i.e., the digital context 310) described above. Such digital content may comprise data that may be ingested into the system (in accordance with, perhaps, the functionality associated with the organizer software tool described further herein below) from one or more data sources, such as business systems (e.g. CRM systems, ERP systems, POS systems, accounting software, etc.), enterprise data stores, data warehouses, data lakes, operational data stores, as well as any other type of kind of databases or data store, such as data inputted by a user, data mined from research reports, among other examples.

This underlying data may be either static data, data updated in a batched manner, such as on a periodic or aperiodic refresh cycle, or data updated in real-time or near real-time (e.g., data provided to the system in the form of a data "stream", which may or may not be buffered to align with the update frequency of the Digital Duplicate's data ingestion method). Other examples of data ingestion may be possible as well.

As depicted, digital content may generally be comprised of links and nodes. In particular digital content 320 may include node data 321, node properties 322, and node instances 323. Further, digital content 320 may also include link data 325, link properties 326, and link instances 327.

As a general matter, node data 321 and link data 325 may include underlying instances of an organization's information that populates a digital context schema, examples of which have been described above. Node data 321 in particular may include the underlying information that populates the conceptual components of the digital context. Referring back to the examples described above, one example conceptual component may be a "physician" component where this conceptual component may be designed to hold data that describes the physicians that are employed by a particular medical services organization. Node data 321 may thus include underlying organization information for the "physician" component, such as individual instances 323 of particular physician information. Thus, for each instance of information that populates the "physician" conceptual component, node data 321 may include a corresponding node. The underlying information within each respective node may be arranged into node properties 322 in accordance with the property structure defined by the conceptual component. For instance, one "physician" node may include node property data "Smith" for the "Last Name" property of the conceptual component, "John" for the "First Name" property of the conceptual component, "Pediatrics" for the "Specialty" property of the conceptual component, "555-867-5309" for the "Telephone Number" property of the conceptual component, and "30" for the "Years in Service" property of the conceptual component, although other examples are possible.

Similarly, link data 325 may include the underlying information that populates the associative components of the digital context. Referring back to the examples described above, one example associative component may be a "visit" component where this associative component may be designed to hold data that describes a particular patient's visit to a particular physician at a particular clinic. Link data 325 may thus include underlying organization information for the "visit" component, such as individual instances 327 of particular visit information. Thus, for each instance of information that populates the "visit" associative component, link data 325 may include a corresponding link. The underlying information within each respective link may be arranged into link properties 326 in accordance with the property structure defined by the associative component. For instance, one "visit" link may include link property data "Jan. 2, 2020" for the "Visit Date" property of the associative component, "1 hour" for the "Duration of Visit" property of the associative component, and "$110" for the "Billed Value" property of the conceptual component, although other examples are possible.

C. Storage Schema

The network of individual data components described above may be stored in one or more data stores 303 in various ways. The structure of the digital context and well as the storage schema, as described herein, allows for network traversal as well as semantic searches (described above) while querying for data. As a result of traversal of the "data network," subsets of the data can be efficiently retrieved and presented to one or more users. Data stores 303 may take the form of one or more of SQL Server, Oracle, Mongo DB, or other storage technologies.

As one example of the various ways in which the individual data components may be stored in data stores 303, relationships between conceptual components 314 and associative components 316 may be stored using what are referred to as unique identifiers ("UIDs"). In this way, each element of each instance of the digital duplicate 301 may have an associated UID (which, depending on the situation, may or may not be unique). As outlined above, the various elements that may have a UID assigned thereto may be (i) domains, (ii) subdomains, (iii) directories, (iv) conceptual components, (v) associative components, (vi) properties, (vii) dictionaries, (viii) semantic groups, and/or (ix) semantic data types. In some implementation, a UID may take the form of a URI (Uniform Resource Identifier), or any other standard identifier type, among other examples.

As an illustrative example the "Patient" conceptual component may exist in data storage 303 in, for instance, table form with underlying digital data populated for the component in the form of [P1, P2, P3, etc.]. Likewise, the "Physicians" conceptual component may exist in data storage 303 in, for instance, table form with underlying digital data populated for the component in the form of [H1, H2, H3, etc.]. Likewise, the "Clinics" conceptual component may exist in data storage in table form with underlying digital data populated for the component in the form of [C1, C2, C3, etc.].

Using this arrangement, the "Visits" associative component may accordingly exist in data storage 303 in, for instance, table form with underlying digital data populated for the associative component in the form of a table containing intersecting data from the other related conceptual components. As an example, one specific instance of the "Visit" component may have data that takes the form [P1, H3, C2], where this instance describes a visit that took place by patient "P1" who was treated by physician "H3" at clinic "C3," although other combinations are be possible.

Reciprocal data tables may be stored in data storage 303 as well. A reciprocal table may serve to identify, for the conceptual component data, whether and to what extent there is associative component data that relates in some way to the conceptual component data. Using the examples set forth above, the "Patient" conceptual component discussed above may contain a reciprocal table that intersects its dependent structural components for each instance of a "Patient," where one instance for Patient "P1" may take the form of [V1, H3, C2]. Other examples of reciprocal tables may be possible as well.

In this way, the data defining the schema for the digital duplicate may be embodied as a "data network" or form of neurosynaptic storage of information, where associative information (such as that described above) is stored at the intersection point of the structural components. Each instance of such data tables for corresponding "Visits," "Patients," "Physicians," and "Clinics" (as examples) may be created from source data by an organizer part of the data ingestion method, described below. This provides certain advantages over traditional data storage models, such as relational models that use fixed relationships between data. As one advantage, the present technique uses a single, atomic template to implement each structural association and its corresponding components in the appropriate storage model. As such, this technique allows for dynamic expansion to create as many associations as may be desired to represent the desired comprehensive network. In comparison to NoSQL databases that store entities as collection of key-value pairs and allow for each record to have a variable structure in each table, or graph databases that use key-value pairs to store relationships between two values, the digital duplicate architecture allows information to be stored within a flexible neurosynaptic data structure to describe the data using the directory, dictionary, and the structural data types. This provides dramatic flexibility both to store and locate data accurately and to capture additional business information within the network.

Further, the data defining the schema for the digital duplicate can be stored in data storage 303 via tables that represent all relationships that comprise the network of components (referred to herein as the "Digital Context" 301). And in this way, data ingested can be placed within this digital context 301. In some implementations, this technique may provide for traceability between data sources and its corresponding data context using UIDs for each source of data and for each contextual element. As an example of this, a patient's "First Name" data element may reference the UID of the structural elements corresponding to this data element (for example, the patient's associated visits) and vice-versa.

The system may be further configured to store a particular digital context 310 and/or the underlying digital content 320 for the particular digital context with an indication that the particular digital context and/or the underlying digital content belongs to unique domain 311 or subdomain. For instance, a unique domain (and/or subdomain) may be established for each instance of the digital duplicate and may be stored in a registry 302. A registry 302 may contain (a) a list of domains and (b) a list of all subdomains that exist within each domain. For instance, returning to the example organization in the medical services industry, the list of domains may contain a domain indicator (e.g., a URI) that is specific to this organization. The domain indicator may thus represent all the data that is stored as the digital content for a digital duplicate related to this organization. Within each domain, there may be one or more subdomains for individual data contexts for the organization. For instance, within the domain for the example organization, in the medical services industry, there may be a subdomain for "Purchasing," and a subdomain for "Marketing," among other examples. This, the list of subdomains may contain subdomain indicators (e.g., URIs) that identify these subdomains.

A registry 302 may also contain data describing locations and identifiers of authentication security services for users accessing data within a given domain. For instance, domains and subdomains may be private (accessible only to users within an organization), and as such may contain such authentication data that serves to describes the various user that have appropriate permissions to access the given domains and/or subdomains. Domains and subdomains may also be public, and therefore accessible to any users or systems outside of an organization. Other examples of data that may be stored in the registry are possible as well.

As explained, the schema for one instance of a digital context may be stored in or with what is referred to as a "dictionary" 312. In this way, a single dictionary 312 may store data that describes the digital context 310 for one specific organization. The system may thus store multiple dictionaries, with one dictionary being stored for each specific organization that utilizes the system to create and store an instance of a digital duplicate 301. In some implementations, however, dictionaries may be shared between domains and/or subdomains. For instance, if a first organization in the medical services industry has already established a dictionary that stores its schema data describing its digital context, then a second similar medial services organization may benefit from using this same dictionary already established for the first organization. In this way, a common set of semantics may be used across organizations in the same or similar industries.

The digital duplicate may be stored via data store 303 using any appropriate data storage technology, including by way of example, graphical databases, relational databases (SQL, Oracle), in-memory data storage, as well as other types of storage. Digital duplicate information may be stored in two or more such database technologies for redundancy and/or performance purposes.

In some implementations an index file may be used as a separation of concerns measure. For instance, an index file that may contain data keys may reside in one location and the digital duplicate data may reside in another, perhaps remote, location. In this way, a set of semantic services may be employed to store and retrieve data specific to the underlying digital duplicate data by first accessing the data keys and then using those data keys to identify and access the location of the underlying digital duplicate data.

IV. EXAMPLE VISUALIZATIONS

A computing device, such as computing device 200 (FIG. 2), which as described above, may serve as one or more of client stations 113 (FIG. 1B) and/or back-end platform 112 (FIG. 1B), may be configured to generate various visualizations of an established digital context. In one example, a computing device may be configured to generate a visualization of an entire digital context (which as mentioned above may, from time to time, be referred to herein as a "semantic network") established for a particular organization, where the structural components of the semantic network are represented as "nodes" and the associative components of the semantic network are represented as "links" between the nodes thus forming a web-like structure.

Figure 4:
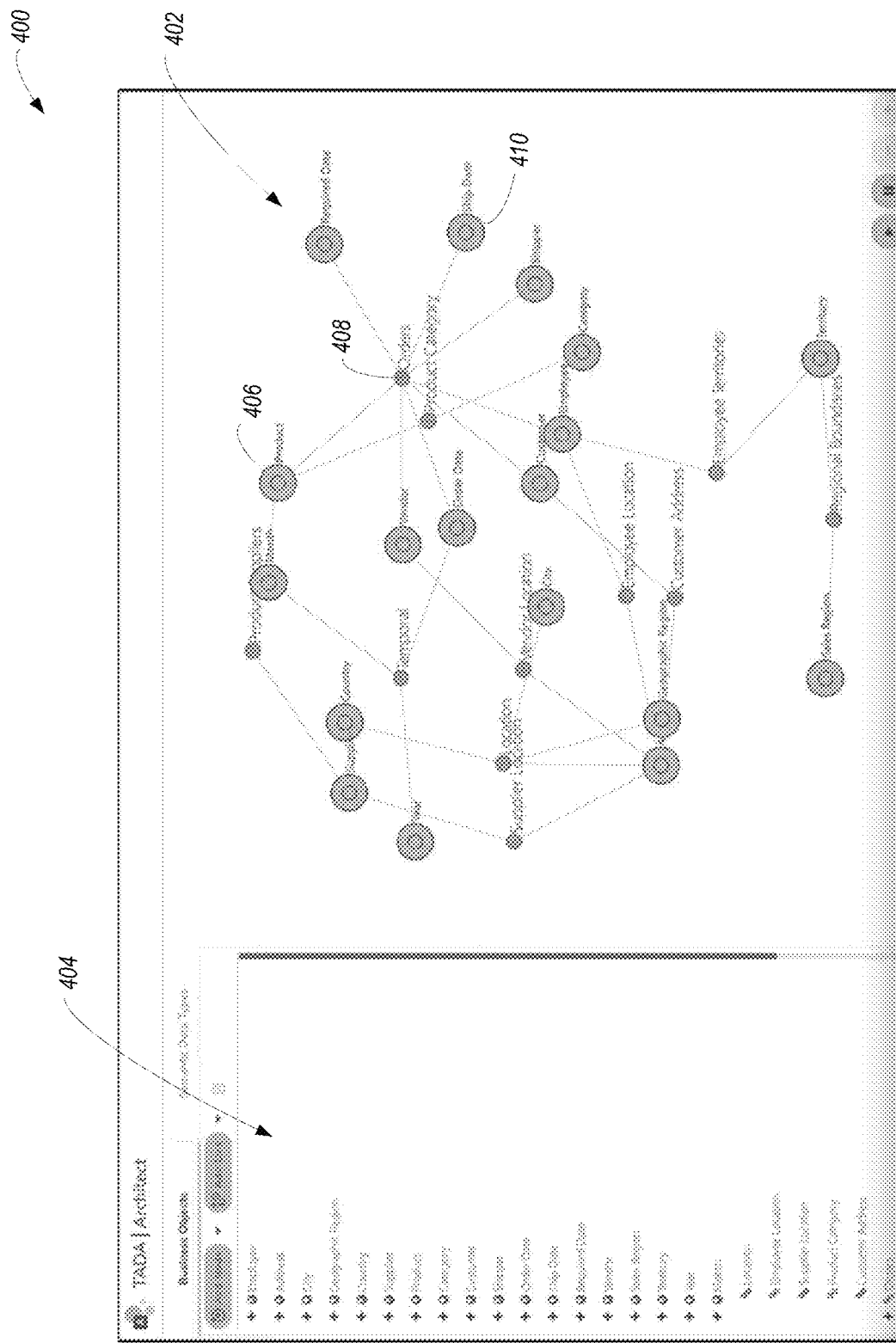
FIG. 4 is an example output produced by a device executing one embodiment of a software tool according to the present disclosure.

To illustrate one example of this, FIG. 4 depicts an example snapshot 400 of a graphical user interface (GUI) that provides a web visualization 402 and a listing 404 of various nodes and links that may comprise an example semantic network. As depicted, the web visualization 402 includes a number of nodes, such as example node 406 for "Product" and example node 410 for "Ship Date." As explained with reference to a different example above, the "Product" node 406 may include various properties that contain data for describing a product, such as product name, product model number, etc. Likewise, "Ship Date" node 410 may include various properties that contain data for describing various shipping dates whereon various products were shipped to customers of the organization or the like, such as month, day, year, etc. As also depicted, web visualization 402 also includes a number of links, such as "Orders" link 408, which may contain data that relates together data represented by two or more nodes. The "Orders" link 408, for instance, may contain data that describes various instances of customer orders for particular products.

A computing device may take one or more actions responsive to receiving user inputs via a GUI that displays a visualization, such as the example visualization depicted in FIG. 4. For instance, responsive to receiving a selection of one of the nodes or links displayed in web visualization 402 (e.g., through a mouse click or a tap on a touch-screen interface, or the like), the computing device may display further information related to the selected node or link, such as displaying the properties of the selected node or link, or displaying data related to the underlying data records that have been assigned to the selected node or link, where such data may be in the form of a data table, graph, or some other format outlining or summarizing the underlying data records. The computing device may take other actions responsive to receiving various user input via the GUI as well, such as by rearranging or repositioning the various nodes and links of the semantic network in response to receiving a click-and-drag input via a mouse or a touch-and-drag input via a touch screen, among other possible inputs and responsive actions.

V. EXAMPLE SECURITY OPERATIONS

It may be advantageous to establish restrictions on accessing the data as it exists in the semantic network at the semantic network level. For instance, although as set forth above, a computing device may be configured to present one or more visualizations of an entire semantic network (i.e., presenting a visualization that includes each and every node and link of the semantic network), including displaying data related to the underlying data records that have been assigned to the nodes or links of the semantic network, it may be advantageous to, at times, present a visualization of just a portion of a semantic network (e.g., presenting a visualization that includes just a subset of the nodes and links of the entire semantic network), including, for instance, displaying data related to the underlying data records that have been assigned to just a subset of the nodes or links of the semantic network. This may be advantageous, for instance, in situations where an organization desires to give one type of user (e.g., employees) access to one type of the organization's data (e.g., employee data) but desires to restrict access of that type of user to other types of the organization's data (e.g., company-financial data).

In some systems, data security operations may be applied at the data source level. For instance, access to entire data sources may be restricted on a user-by-user basis with some users having access to all data stored in a given data source and other users not having access to any of the data stored in the given data source. However, this may become problematic when data sources are used to store large amounts of an organization's data. In such cases, a single data source may, for instance, store multiple types of data (e.g., employee-related data and company-financial data), and thus it may be desirable to allow certain users to access some but not all of the data stored in a particular data source. Depending on the data source, this may or may not be possible. In situations where it is possible, the data security profiles may be applied on a table-by-table or column-by-column basis, which is a cumbersome and time-consuming process to manage. In situations where allowing certain users to access some but not all of the data stored in a particular data source is not possible, then different types of data may have to be split out and stored in separate data sources (e.g., with one data source storing employee-related data and another separate data source storing company-financial data, among other possibilities). This too may lead to added cost associated with implementing multiple data sources. And in either case, managing the security profiles when organizations implement changes in the underlying data sources may further increase the time and expense. For instance, when an organization adds a column or table in a data source or moves data from one column or table to another column or table in the same data source, all security profiles may have to be modified to account for this change.

To address these situations, and perhaps others, disclosed herein is an example software tool that may facilitate engaging in data security operations for semantic networks and applying these data security operations at the semantic network level as opposed to applying the data security operations at the data source level. Applying the data security operations at the semantic network level rather than at the data source level may result in more efficient application of data security operations. Indeed, if data security operations are applied at the semantic network level, an organization may make a changes to the underlying data sources (such as adding a data source, moving data from one data source to another data source, or even combining data from multiple data sources into a single data source) without affecting the existing application of the data security operations.

For instance, as will be appreciated with the benefit of the present disclosure, if an organization moves, say, employee data from one data source to another data source that stores, say, company-financial data, so long as the relationship between the underlying data and the semantic network remains unaffected (e.g., the employee-related data remains assigned to the various employee-related nodes and links of the semantic network), the existing data security profiles will remain unaffected too. In this way, for instance, users authorized to access only the employee-related data will continue to be able to access the employee-related data (even though it is now stored in another data source) and will not be granted access to the company-financial data as a result of the change to the underlying data source. Thus, an organization may make changes to the underlying data sources without having to reestablish or otherwise modify the data security profiles. These, and other advantages, will become apparent in view of the entire disclosure.

As disclosed herein, data security operations applied at the semantic network level may include operations for establishing user permissions for accessing various nodes and links of a semantic network, which provides access to the underlying data assigned to these nodes and links (such as data related to a digital duplicate, including data related to the digital context and the digital content of a digital duplicate), and operations for generating visualizations related to a semantic network in accordance with these user permissions. In this respect, and using the software tool disclosed herein, an administrator or the like may authorize particular authorized users to access the underlying data assigned to certain selected portions of the semantic network. These authorized users may then be able to access the data assigned to the selected portions of the semantic network, access visualizations related to the underlying data assigned to the selected portions of the semantic network, determine insights related to the underlying data assigned to the selected portions of the semantic network, and manipulate data related to the underlying data assigned to the selected portions of the semantic network. However, the authorized users may not be able to access data assigned to other portions of the semantic network (i.e., portions of the semantic network that were not selected), meaning that the authorized users may not be able to access visualizations related to the underlying data assigned to the other portions of the semantic network, determine insights related to the underlying data assigned to the other portions of the semantic network, or manipulate data related to the underlying data assigned to the other portions of the semantic network.

For purposes of illustration only, example operations are described herein as being carried out by a computing device, such as computing device 200 (FIG. 2), which as described above, may serve as one or more of client stations 113 (FIG. 1B) and/or back-end platform 112 (FIG. 1B). In this respect, it should be understood that, depending on the implementation, the operations discussed herein below may be carried out entirely by a single computing device, such as one or more of client stations 113 or by back-end platform 112, or may be carried out by a combination of computing devices, with some operations being carried out by back-end platform 112 (such as computational processes and data-access operations) and other operations being carried out by one or more of client stations 113 (such as display operations and operations that receive user inputs). However, other arrangements are possible as well.

To help describe some of these operations, flow diagrams may also be referenced to describe combinations of operations that may be performed by a computing device. In some cases, a block in a flow diagram may represent a module or portion of program code that includes instructions that are executable by a processor to implement specific logical functions or steps in a process. The program code may be stored on any type of computer-readable medium, such as non-transitory computer readable media (e.g., data storage 204 (FIG. 2)). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. Flow diagrams may also be modified to include additional blocks that represent other functionality that is described expressly or implicitly elsewhere herein.

Figure 5A:
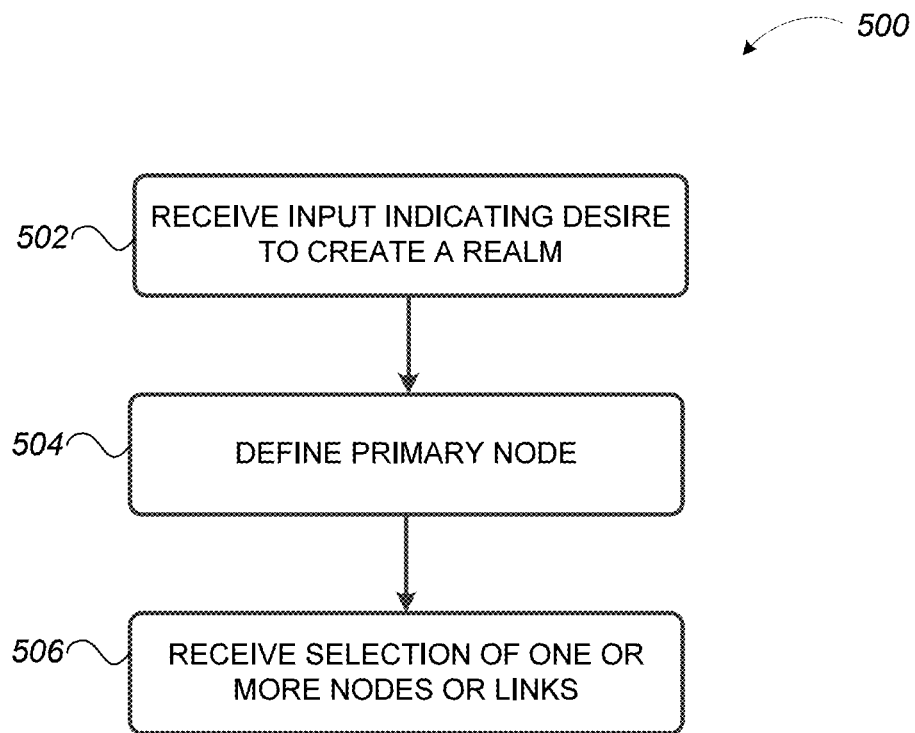
FIG. 5A is a flow diagram depicting example operations that may be carried out in accordance with one or more embodiments of the present disclosure.

Turning first to FIG. 5A, this figure presents a flow diagram 500 depicting one example of a process for engaging in data security operations for semantic networks, and in particular, for establishing, and presenting visualizations related to, a "realm" of a semantic network. As depicted, this process may generally involve the following operations: (i) at block 502, a computing device may receive an input indicating a desire to create a realm of a semantic network, (ii) at block 504, the computing device may define a primary node for the realm, and (iii) at block 506, the computing device may receive a selection of one or mode nodes or links of the semantic network to include in the realm. Each of these operations will now be discussed in further detail with reference, in some cases, to example snapshots of GUIs that may facilitate some or all of the disclosed functionality.

Turning first to block 502, the computing device may receive an input indicating a desire to create a "realm" of a semantic network. A realm of an organization's semantic network is generally a subset of nodes and links of the semantic network, where, in some embodiments, the subset of nodes and links relate to some aspect of the organization. For instance, one type of realm may be an "employee realm," which may include various nodes and links that describe data that ought to be accessible to various employees of the organization (such as employee data) and may not include nodes or links that describe data that ought not to be accessible to various employees (such as company financial data). As another example, another type of realm may be a "customer realm," which may include various nodes and links that describe data that ought to be accessible to various customers of the organization (such as customer data and/or order data) and may not include nodes or links that describe data that ought not to be accessible to various customers (such as employee data and/or company financial data). Other types of realms are possible as well.

Figure 6A:
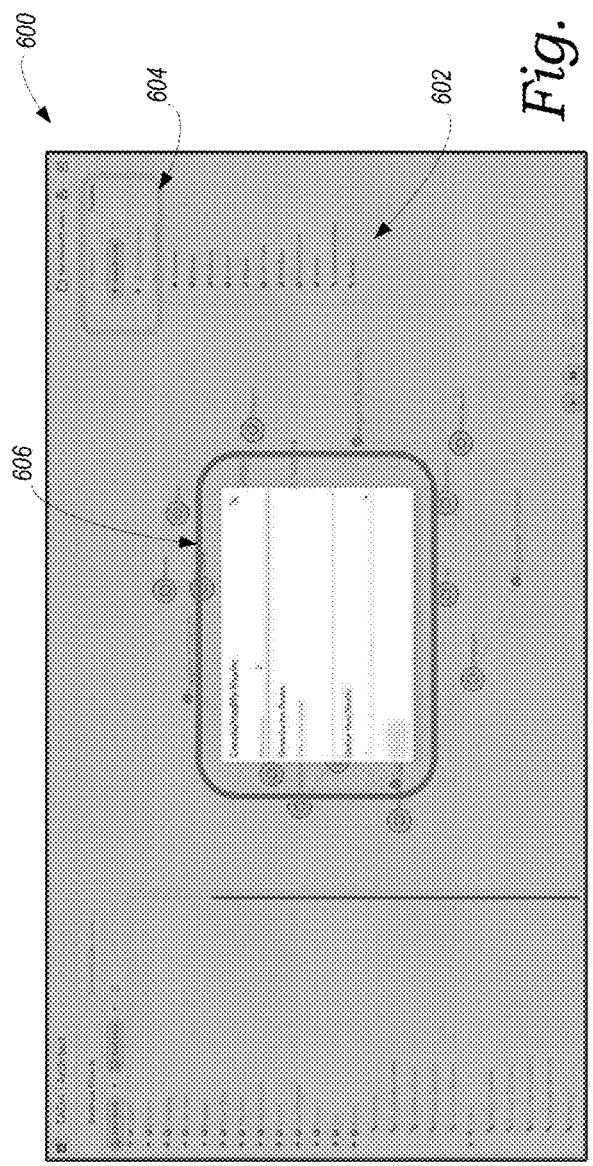
FIG. 6A is an example output produced by a device executing one embodiment of a software tool according to the present disclosure.

A computing device may receive an input indicating a desire to create a realm in various ways. As one example, a computing device may present via a GUI one or more screens through which a user may provide to the computing device various user inputs, including an instruction to create a new realm and other various identifying information for the new realm. To illustrate one example of this, FIG. 6A depicts an example snapshot 600 of a GUI through which a user may provide a user input indicating a desire to create a new realm. For instance, as depicted, the GUI may include a realm navigation panel 602 that includes an "Add Realm" button 604. In operation, the computing device may receive a user selection of the "Add Realm" button (e.g., by way of a mouse click or touchscreen tap, among other possibilities) and may responsively display an information window 606 through which the user may provide additional user inputs to, for instance, to name the new realm and provide a text description of the new realm. Other ways for a computing device to receive an input indicating a desire to create a new realm may be possible as well.

Returning to FIG. 5A at block 504, the computing device may next define what is referred to as a "primary node" for the realm. A primary node for a realm may generally be a node of a semantic network that contains underlying data records desired to be used as the basis to limit access to the underlying data of the realm. For instance, for an "employee realm," which may be designed to include nodes and links of a semantic network that ought to be accessible to employees of an organization and not include nodes or links that ought not to be accessible to employees of the organization, a primary node for this realm may an "employee" node. In this way, and as will be described further herein, the underlying data records of the employee node may be used as a basis to limit access to the underlying data of the rest of the realm. For instance, in one example, a particular data record of the primary node may be selected (e.g., a particular employee) and, for a given user or set of users, access to the underlying data of a realm may be limited to just those data records that relate to the selected data record of the primary node. Other examples of primary nodes are possible as well.

Figure 6B:
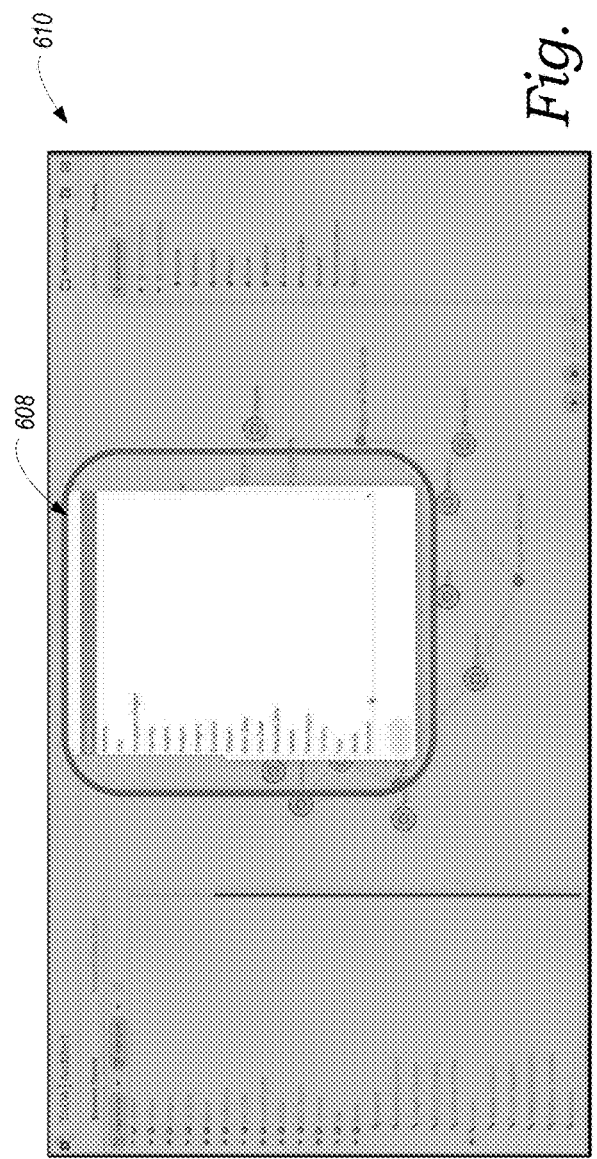
FIG. 6B is an example output produced by a device executing one embodiment of a software tool according to the present disclosure.

A computing device may define a primary node in various ways. As one example, a computing device may receive a user input indicating a particular node in the semantic network to use as the primary node for the realm being created. To facilitate this, the computing device may, as noted above, present via a GUI one or more screens through which a user may provide to the computing device various user inputs, including an indication or a selection of a node to use as the primary node for a realm being created. As one example of this, FIG. 6B depicts an example snapshot 610 of a GUI that is displaying an information window 608 listing the various nodes of the semantic network. Upon selection of one of the listed nodes (e.g., the "employee" node as depicted in FIG. 6B), the computing device may then define the primary node for the realm being created as this selected node as the primary node for the realm. Other ways of defining a primary node for a realm may be possible as well.

Figure 7:
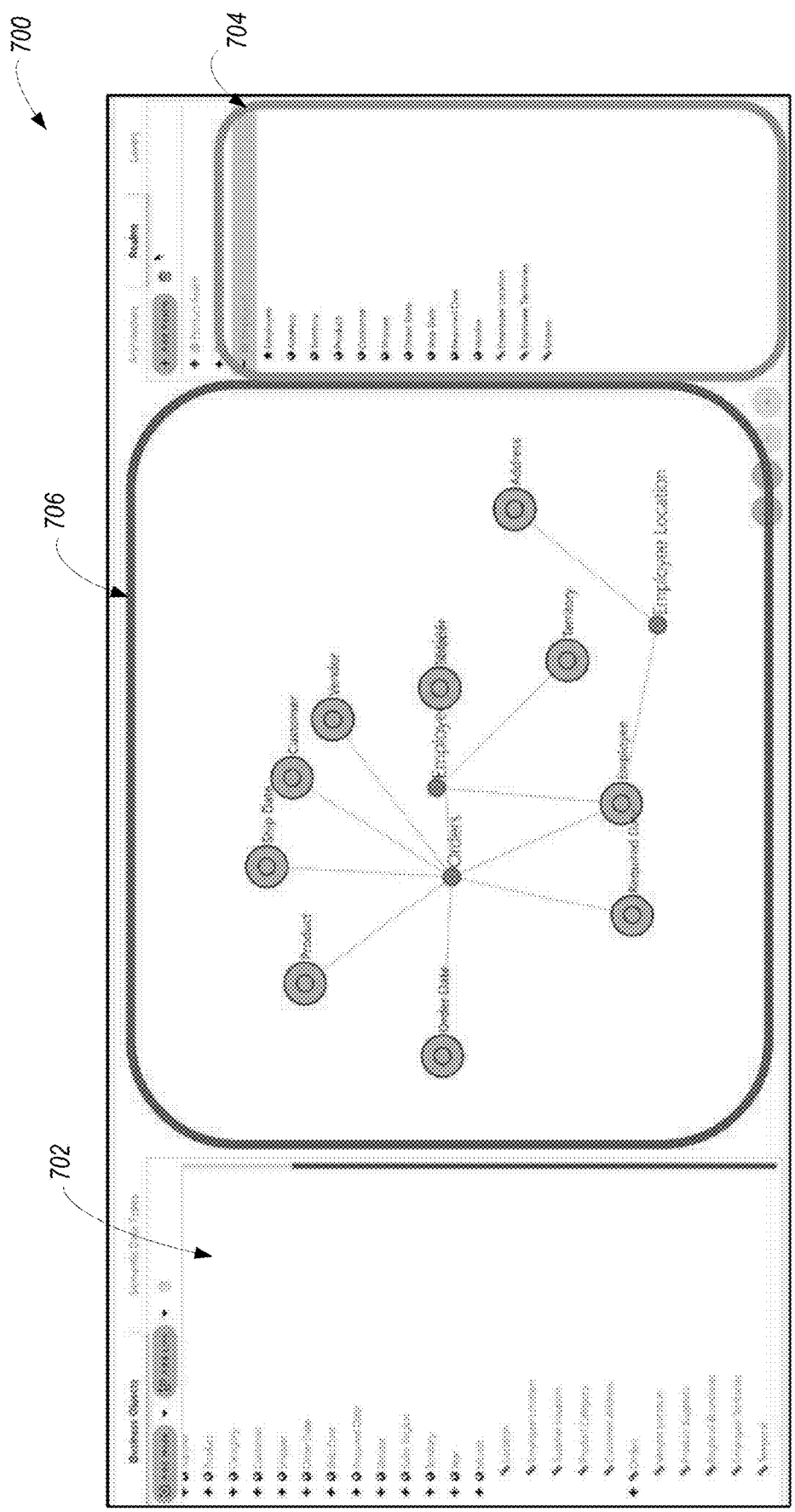
FIG. 7 is an example output produced by a device executing one embodiment of a software tool according to the present disclosure.

Returning to FIG. 5A at block 506, the computing device may next receive a selection of one or more nodes or links to define the realm. The computing device may receive this selection in a variety of ways. As one possibility, the computing device may present a GUI through which a user may provide a user input or series of user inputs that comprise a selection of one or more nodes or links. To illustrate one example of this, FIG. 7 depicts an example snapshot 700 of a GUI that displays an object selection panel 702, a realm navigation panel 704, and a network display location 706. As depicted, the object selection panel 702 may list the various nodes and links of the entire semantic network. To select one or more of the nodes or links of the semantic network, the computing device may provide the ability to click on a text listing of one of the nodes or links and drag that text listing to the realm navigation panel 704 to thus select that node or link for inclusion into the realm. For instance, to select the "Shipper" node for inclusion into the realm being created, a user may click on the "Shipper" node text entry and corresponding icon listed in the object selection panel 702 and drag it over into the realm navigation panel 704. Likewise, to select the "Orders" link for inclusion into the realm being created, a user may click on the "Orders" link text entry and corresponding icon listed in the object selection panel 702 and drag it over into the realm navigation panel 704. Other ways of providing a user input to indicate a selection of one or more nodes or links of a semantic network is possible as well.

In some embodiments, when a link (such as "Orders" link) is selected for inclusion in a realm (e.g., by a user dragging and dropping a text entry and corresponding icon of a link from the object selection panel 702 to the realm navigation panel 704), the computing device also includes in the realm being created any nodes that are associated by the selected link. For instance, in the example semantic network depicted in FIG. 7, if a user selected the "Employee Location" link (e.g., by dragging and dropping a text entry and corresponding icon of the "Employee Location" link from the object selection panel 702 to the realm navigation panel 704), the computing device may also populate in the realm navigation panel 704 the "Employee" and "Address" nodes, thus selecting these nodes for inclusion into the realm being created as well.

As also depicted in FIG. 7, the computing device may provide a visualization to help preview what nodes and links have been selected for inclusion into the realm being created. For instance, as depicted in display location 706, the computing device may display the "Employee Location," "Employee Territories," and "Orders" links as smaller circles and may also display the "Employee," "Address," "Territory," "Product," "Customer," "Shipper," "Order Date," "Ship Date," "Required Date," and "Vendor" nodes as each of these nodes are associated with one or more of the selected links. As depicted, this realm includes just a subset of the nodes and links of the full semantic network (e.g., as depicted in FIG. 4). The computing device may provide other visualizations to help preview and/or visualize the realm as well. Notably, Turning next to FIG. 5B, this figure presents a flow diagram 520 depicting another example of a process for engaging in data security operations for semantic networks, and in particular, for establishing and applying security profiles for instances of a semantic network, including realms. As depicted, this process may generally involve the following operations: (i) at block 522, a computing device may receive an indication of a user for which to apply a security profile, (ii) at block 524, the computing device may receive a section of a permission profile to apply for the user, (iii) at block 526, the computing device may receive a selection of a semantic network instance, (iv) at blocks 528 and 530, the computing device may either or both receive a selection of semantic context information to block for the user or receive a selection of semantic context information to selectively filter for the user, and (v) at block 532, the computing device may thereafter present a visualization of the semantic network to the user implementing either or both of the blocked context information or the filtered context information. Each of these operations will now be discussed in further detail with reference, in some cases, to example snapshots of GUIs that may facilitate some or all of the disclosed functionality.

Figure 8A:
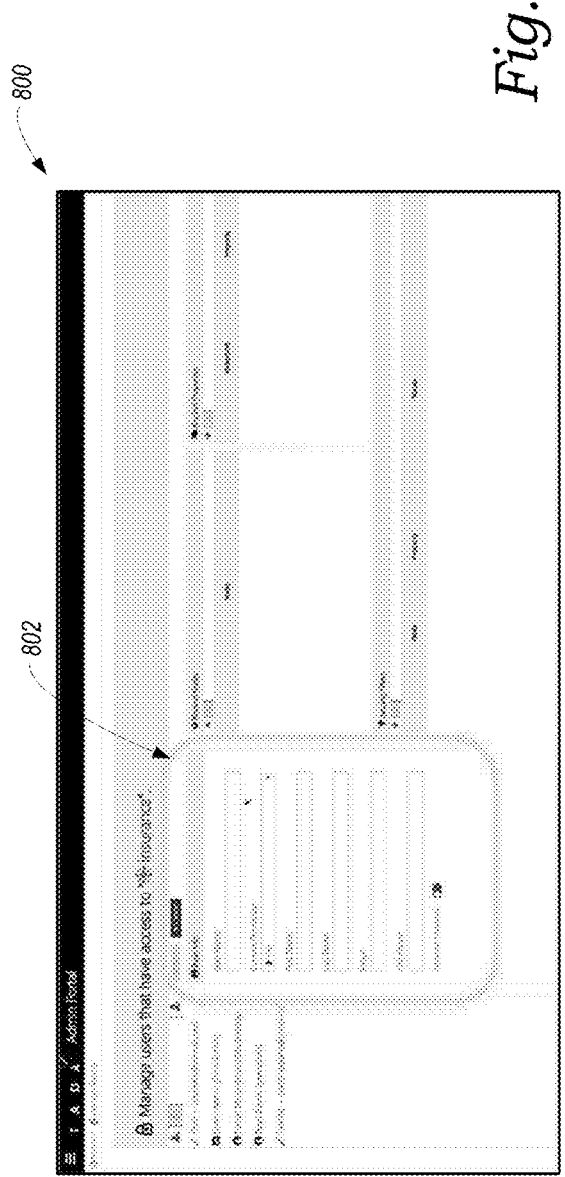
FIG. 8A is an example output produced by a device executing one embodiment of a software tool according to the present disclosure.

Turning first to block 522, the computing device may first receive an indication of a user for which to create and apply a security profile. To facilitate receive this indication, the computing device may present via a GUI one or more screens though which a user may provide various user inputs in order to provide the computing system with an indication of a user for which to create and apply a security profile. To illustrate one example of this, FIG. 8A depicts an example snapshot 800 of an admin tool that presents a GUI through which a user can provide one or more user inputs that facilitate the computing device establishing and applying security profiles for instances of a semantic network, including realms. As depicted, the GUI may provide a user information area 802 within which a user may provide various user inputs to provide the computing device with an indication of a user for which to create and apply a security profile. For example, as depicted, the user information area 802 may include a location for receiving a user input to provide a user name and locations for receiving other information about the user, such as a last name, first name, email address, cell phone, etc. Other ways for receiving an indication of a user for which to create and apply a security profile may be possible as well.

Returning to FIG. 5B at block 524, the computing device may next receive a selection of a permission profile to apply for the user. A permission profile may define what a user can and cannot do with respect to modifying various aspects of a semantic network or a realm of a semantic network. For instance, one type of permission profile may be a "user" profile, whereby a user granted with a "user" permission profile would only be able to view information contained within the semantic network but may not be able to modify any information, such as by creating new realms, or creating or modifying nodes, links, or properties. Another type of permission profile may be a "super user" profile, whereby a user granted with this profile would be able to view information contained within the semantic network and also modify insights related to the information, and perhaps other aspect about the semantic network, such as creating or modifying realms and/or nodes, like, or properties. And yet another type of permission profile may be an "administrator" profile, whereby a user granted with this profile would be able to view and modify information contained within the semantic network as well as grant and modify permissions for other users. Finally, yet another type of permissions profile may be a specific group profile, whereby a user granted with a specific group profile may have one of the various types of permissions profiles discussed above (e.g., a user, super user, or administrator profile), perhaps with other individual security settings, the establishment of which is described further herein.

The computing device may receive a selection of a permission profile to apply for a user in a variety of ways. As one possibility, the computing device may present a GUI, such as that depicted in FIG. 8A, via which a user may provide a user input selecting one of a set of available user profiles to apply for the selected user. For instance, the GUI may include a drop-down list or the like that lists the available permission profiles. A user may then select one of the permissions profiles, through a mouse click or touchscreen tap, or the like, to thereby select one of these profiles. The computing device may receive a selection of a permission profile in other ways as well.

Figure 8B:
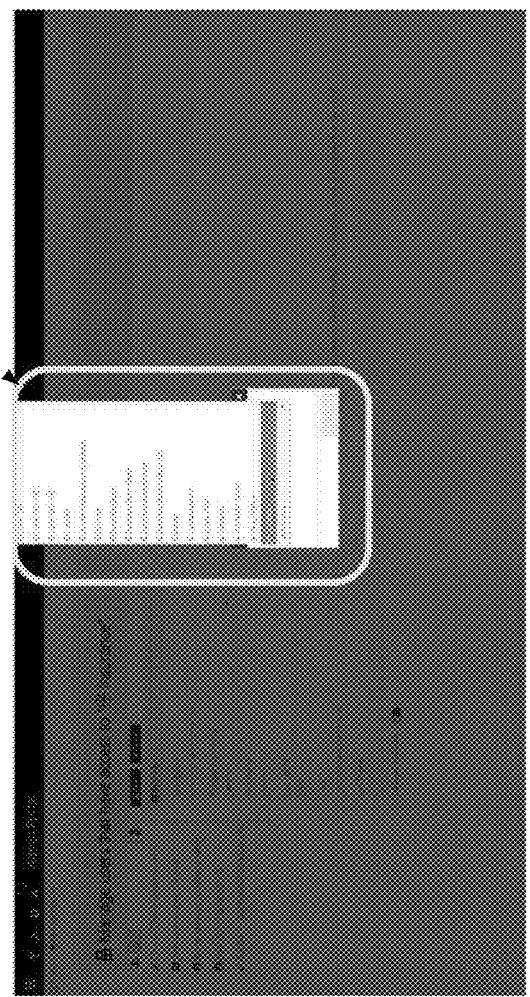
FIG. 8B is an example output produced by a device executing one embodiment of a software tool according to the present disclosure.

Next at block 526, the computing device may receive a selection of a semantic network instance. One type of semantic network instance may be an entire semantic network, such as a semantic network that may have been created for an organization, which may include each and every node, link, and property of the semantic network. Another type of semantic network instance may be just a subset of an entire semantic network, such as a realm, described above. To facilitate receiving a section of a semantic network instance, the computing device may present via a GUI, one or more drop-down lists that include the semantic network instances (including realms) that are available for selection. FIG. 8B depicts an example snapshot 810 of a GUI that depicts an example drop-down list that 804 lists example semantic network instances for selection. Through this list, for instance, a user may select one or more of the semantic network instances listed, through a mouse click or touchscreen tap or the like, and thereby provide the computing device with a selection of a semantic network instance. The computing device may receive a section of a semantic network instance in other ways as well.

Next at block 528, the computing device may receive a selection of semantic context information to block for the user. The computing device may ultimately present visualizations for the selected user and exclude from these visualizations any semantic information that has been blocked. For instance, the computing device may receive a selection of one or more nodes to block. In this case, when the computing device presents a visualization related to the semantic network (e.g., a visualization of the semantic network in a web-like structure or a visualization that displays data related to the underlying data records that have been assigned to nodes and links of the semantic network, where such data may be in the form of a data table, graph, or some other format outlining or summarizing the underlying data records), the computing device will omit from the visualization any data related the blocked node(s). For instance, where the visualization is a web-like structure illustrating the semantic network, the computing device will omit from this visualization any depiction of the blocked node(s). In another example, where the visualization displays data related to the underlying data records that have been assigned to nodes and links of the semantic network, such as a data table, graph, or some other format outlining or summarizing the underlying data records, the computing device will omit from the visualization any underlying data records that have been assigned to a blocked node, and any insights defined for the semantic network that contain or are related to the data records assigned to a blocked node.

In another example, the computing device may receive a selection of one or more properties to block. In this case, the computing device may, like described above, present visualizations related to the semantic network that omit certain data, but the computing device may omit data on a more granular level. For instance, if the computing device receives a selection of one or more properties of one or more nodes to block, then the computing device may present visualizations for the selected user and exclude from these visualizations any data related to the blocked properties of the nodes, but include any data related to the other properties of the nodes. By way of example, if the computing device receives a selection of the property "Last Name" of the node "Employees" to block, then for any visualizations that the computing device ultimately presents to the given user, the computing device may omit any data related to the "Last Name" property of the "Employee" node (such as omitting from the visualization any employee last names) but including in the visualization the other properties of the "Employee" node, such as "First Name" and perhaps an "Employee ID," (assuming the computing device has not also received selections to block these properties as well), among other possible properties.

In some embodiments, the computing device may receive a selection of semantic context information to block for the user on a less granular level. In one example of this, the computing device may receive a selection of an entire semantic data type to block for the user. For instance, if the computing device receives a selection of an "Email Address" semantic data type to block for the user, then for any visualizations that the computing device ultimately presents to the given user, the computing device may omit any data that is assigned to the "Email Address" semantic data type no matter what node, property, or link the within which the data happens to be assigned.

To facilitate receiving a selection of semantic context information to block for the user, the computing device may present via a GUI one or more graphical locations within which the computing device may receive user inputs to select semantic context information to block for the user. As depicted in FIG. 9A, for instance, snapshot 900 depicts a GUI that displays a graphical location 902 within which a user can select nodes of the semantic network to block and/or select properties of certain nodes of the semantic network to block. As specifically depicted in graphical location 902, for instance, a user may have selected an "Agency" node of a semantic network to block. In this example, when the computing device ultimately depicts a visualization of the semantic network for this user, the computing device will omit from this visualization any depiction of the "Agency" node and/or any underlying data records that have been assigned to the "Agency" node, depending on the type of visualization, including any insights that may have been created that include data assigned to the "Agency" node Turning next to snapshot 910 in FIG. 9B, this snapshot depicts a GUI that displays a similar graphical location 912 within which a user can also select properties of a node or link of the semantic network to block. As specifically depicted in graphical location 912, for instance, a user may have selected an "Agent_Activity_BusinessProcess" link (which may, for example, link an "Agent_Activity" node and a "Business Process" node of the semantic network), and the user may have also selected a "TransactionPremiumAmt" property of the selected link to block. In this example, when the computing device ultimately depicts a visualization of the semantic network for this user, the computing device will omit from this visualization any depiction of the "TransactionPremiumAmt" property of the "Agent_Activity_BusinessProcess" link and/or any underlying data records that have been assigned to this property, depending on the type of visualization. Other ways to facilitate receiving a selection of semantic context information to block for the user are possible as well.

Figure 5B:
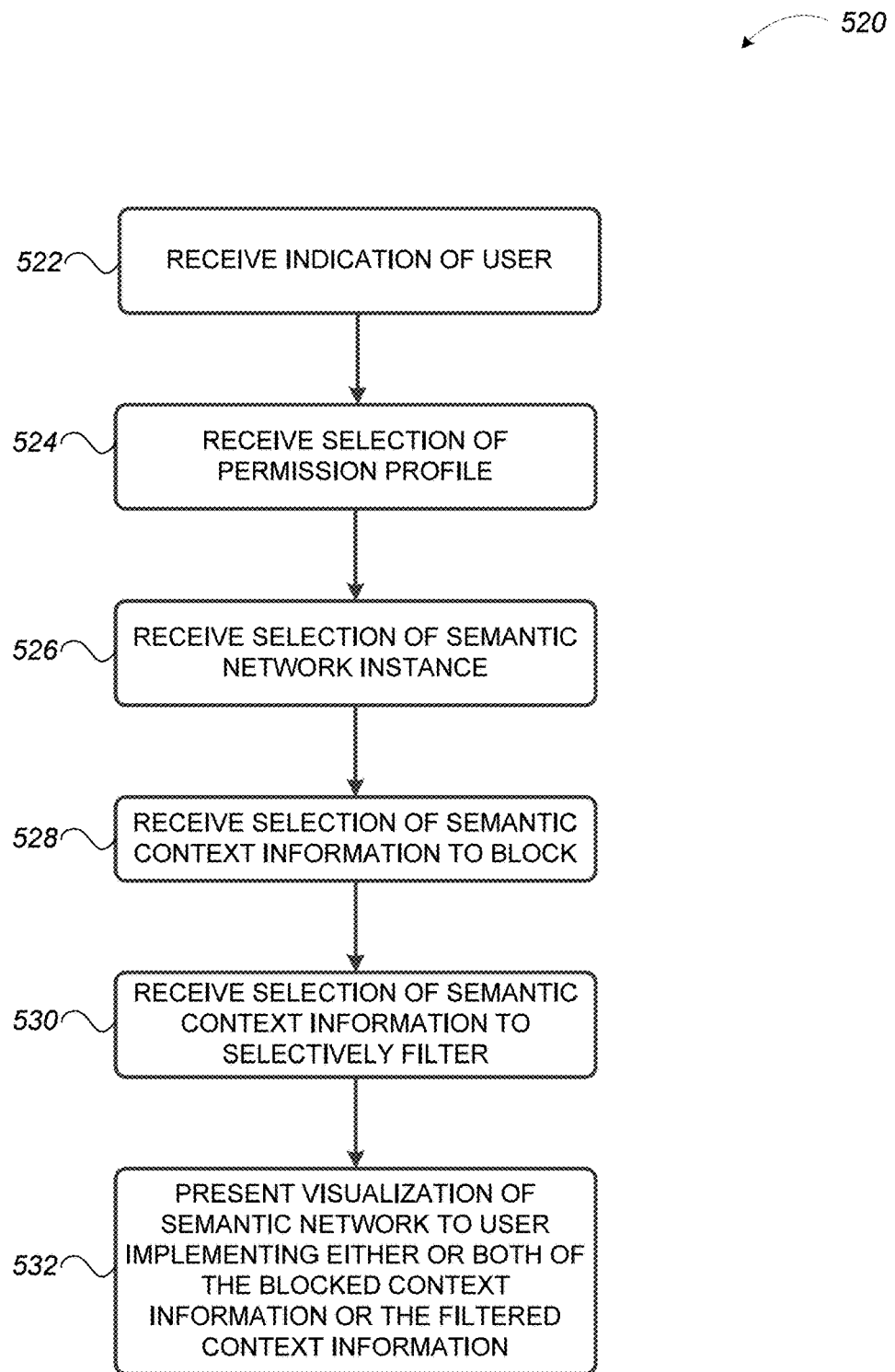
FIG. 5B is a flow diagram depicting example operations that may be carried out in accordance with one or more embodiments of the present disclosure.

Turning next to block 530 in FIG. 5B, the computing device may receive a selection of semantic context information to selectively filter for the user. As explained, the computing device may ultimately present visualizations for the selected user. However, if the computing device has received a selection of semantic context information to filter, then the computing device may include in the visualization semantic information data that conforms to the filter but exclude from these visualizations any semantic information that does not conform to the filter.

For instance, the computing device may receive a selection of one or more nodes and/or properties to selectively filter. In this case, when the computing device presents a visualization related to the semantic network (e.g., a visualization of the semantic network in a web-like structure or a visualization that displays data related to the underlying data records that have been assigned to nodes and links of the semantic network, where such data may be in the form of a data table, graph, or some other format outlining or summarizing the underlying data records), the computing device will include in the visualization only data related to the one or more nodes and/or properties that have been selected for the filter and exclude from the visualization data not related to the selectively-filtered nodes. For instance, where the visualization is a web-like structure illustrating the semantic network, the computing device will only include a depiction of the selected nodes or properties and will omit from this visualization any depiction of the other nodes or properties. In another example, where the visualization displays data related to the underlying data records that have been assigned to nodes and links of the semantic network, such as a data table, graph, or some other format outlining or summarizing the underlying data records, the computing device will only display data related to the selected nodes or properties and will omit from the visualization any underlying data records that are related to other nodes or properties.

In another example, the computing device may receive a selection of one or more nodes, properties, and underlying data to filter. In this case, the computing device may, like described above, present visualizations related to the semantic network that omit certain data, but the computing device may include other those data records that match or relate to the selected underlying data records for the selected property of the selected node. For instance, if the computing device receives a selection of one or more data records of a particular property of a particular node, then the computing device may present visualizations for the selected user that include the underlying data records or data related to the underlying data records, and exclude from these visualizations any other data records. By way of example, if the computing device receives a selection of the "John Smith" underlying data record for the "Employee Name" property for the "Employee" node, then for any visualizations that the computing device ultimately presents to the given user, the computing device may only include in these visualizations data records that are or are related to the "John Smith" employee and will omit from the visualization other data records that are or that relate to other employees.

In some embodiments, the computing device may receive a selection of semantic context information to selectively filter for the user on a less granular level. In one example of this, the computing device may receive a selection of an entire semantic data type to selectively filter for the user. For instance, if the computing device receives a selection of an "Email Address" semantic data type to filter for the user, then for any visualizations that the computing device ultimately presents to the given user, the computing device may include in these visualizations only such data that is assigned to the "Email Address" semantic data type no matter what node, property, or link the within which the data happens to be assigned related to the "Email Address" semantic data type and omit from the visualization any data.

Figure 10A:
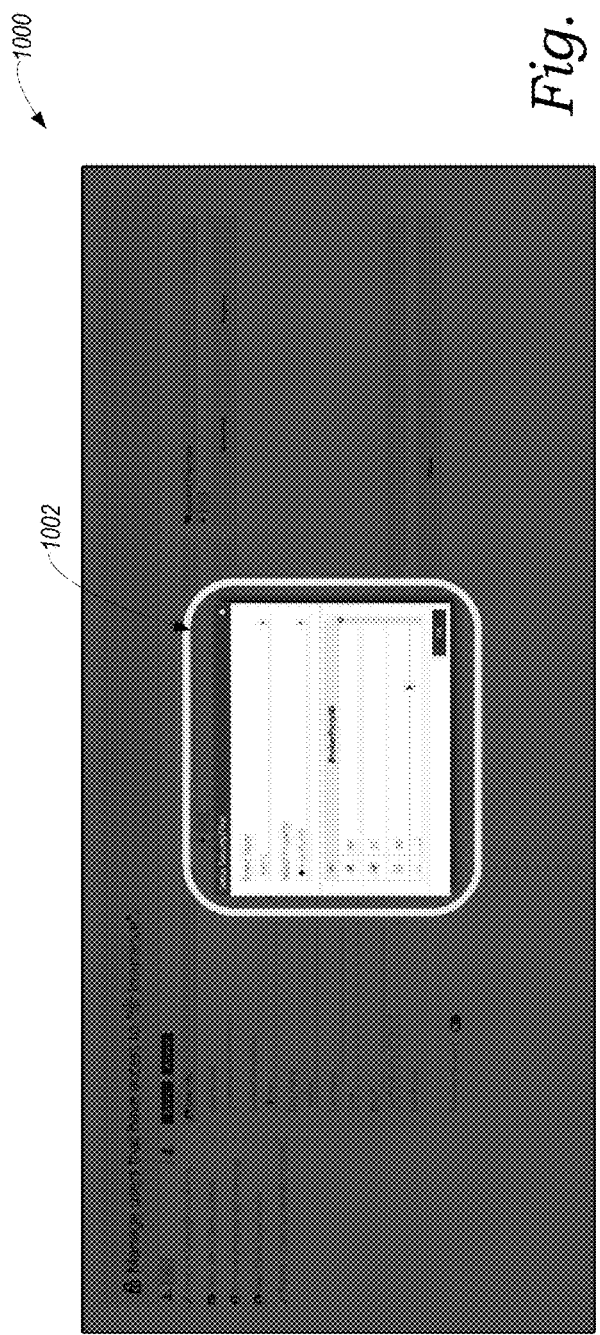
FIG. 10A is an example output produced by a device executing one embodiment of a software tool according to the present disclosure.

To facilitate receiving a selection of semantic context information to block for the user, the computing device may present via a GUI one or more graphical locations within which the computing device may receive user inputs to select semantic context information to selectively filter for the user. As depicted in FIG. 10A, for instance, snapshot 1000 depicts a GUI that displays a graphical location 1002 within which a user can select a node, property, and/or underlying data records assigned to the property and node to selectively filter for the user. As specifically depicted in graphical location 1002, for instance, a user may have selected the "Agency" node of a semantic network, and the "BrokerPartyID" property of that node. Further, the user may have selected underlying data records of the "BrokerPartyID" property that match data values of "84" and "87." In this example, when the computing device ultimately depicts a visualization of the semantic network for this user, the computing device will only include in this visualization underlying data related to these selected "BrokerPartyID" values. Depending on the embodiment, including in this visualization underlying data related to these selected "BrokerPartyID" values may mean that the computing device would also include in the visualization underlying data from other nodes and other properties of the semantic network, so long as this other data is related to the selected "BrokerPartyID" values. For instance, if another node, say, a "Sales" node, contained data related to sales made by particular brokers, including for instance brokers represented by the selected "BrokerPartyID" values, then the computing device may also include in the visualization underlying data assigned to these sales (e.g., data related to sales made by the brokers represented by these selected "BrokerPartyID" values).

Figure 10B:
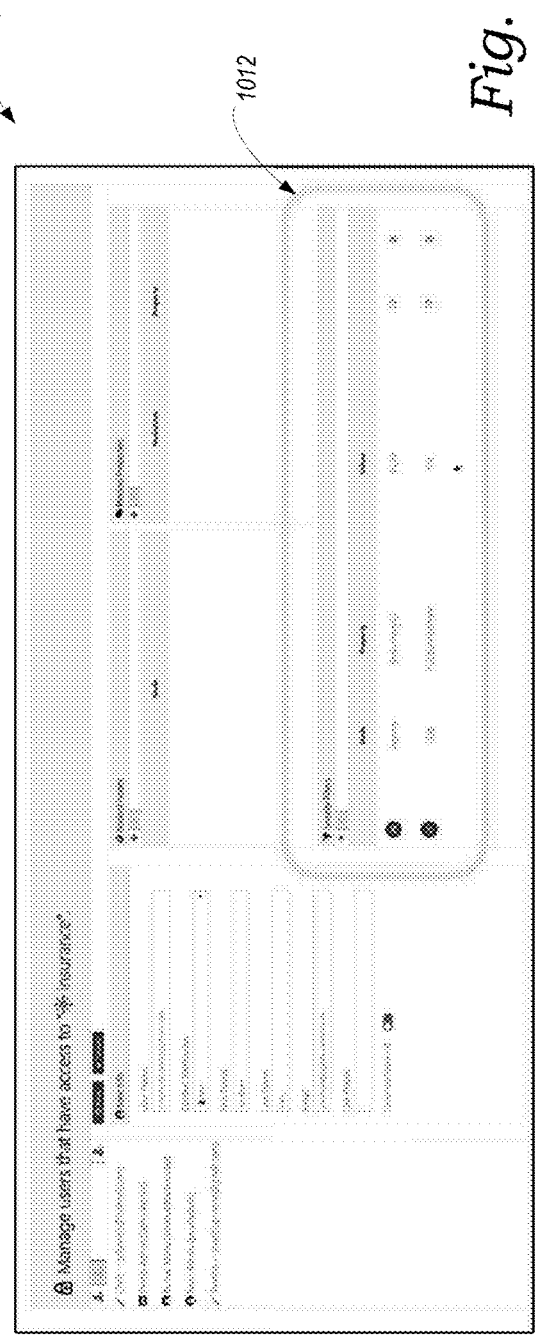
FIG. 10B is an example output produced by a device executing one embodiment of a software tool according to the present disclosure.

FIG. 10B depicts another snapshot 1010 of a GUI that includes a graphical location 1012 that depicts various filters that have been applied for a particular user. For instance, as depicted, the computing device may have received multiple selections of semantic context information to selectively filter for the user. As depicted in this particular example, the computing device may have received a selection of data values "84" and "87" from the "BrokerPartyID" property of the "Agency" node and a selection of a data value "CN" from the "POLBusinessType" property of the "LOB" node. In practice, the computing device may receive many different selections of semantic context information to selectively filter for a given user. When a computing device receives multiple selections of semantic context information to filter for a given user, such as is depicted in graphical location 1012 in FIG. 10B, the computing device may include in a visualization underlying data so long as the underlying data relates to one (or more) of the selected semantic context information. Other ways to depict semantic context information that has been selectively filtered for a given user and other ways to facilitate receiving a selection of semantic context information to selectively filter for a given user are possible as well.

In embodiments in which, at block 526, the computing device received a selection of a realm as the selection of a semantic network instance, then the computing device may engage in additional functionality in connection with the functionality described above with respect to block 530. For instance, responsive to receiving a selection of a realm as the selection of the semantic network instance, the computing device may retrieve from data storage the node that was defined as the primary node during creation of the realm (e.g., as described above with respect to block 504 (FIG. 5A). Further, the computing device may responsively prompt the user (via a GUI) to select one or more underlying data records assigned to a property of this primary node to selectively filter for the user, similar to the procedure described above with respect to block 530.

For instance, in an example in which an "Employee" realm has its primary node defined to be the "Employee" node, then the computing device may ultimately prompt the user (via a GUI) to select one or more underlying data records assigned to the "Employee" node (e.g., data records that represent individual employees) to selectively filter for the user. In this way, when the computing device presents to the user a visualization related to the "Employee" realm, the computing device may include in this visualization only those underlying data records (e.g., data records related one or more employees) that are contained within the nodes and links selected for inclusion in the realm (e.g., as described above with respect to block 506 (FIG. 5A)) and that also relate to the underlying data records of the primary node selected during the aforementioned step. In this way, a realm (e.g., an "Employee" realm) can be designed to include only those nodes and links of the semantic network that include data that ought to be viewed by certain users (e.g. employees) and can be further designed to limit which data records are accessible depending on which user (e.g., which employee) is viewing the visualization related to the realm.

Finally, returning to FIG. 5B, at block 532 the computing device may present to the user a visualization of the semantic network implementing either or both of the blocked context information and/or the filtered context information. As indicated above, if the computing device received a selection of semantic context information to block, then the computing device may present a visualization related to the semantic network (e.g., a visualization of the semantic network in a web-like structure or a visualization that displays data related to the underlying data records that have been assigned to nodes and links of the semantic network, where such data may be in the form of a data table, graph, or some other format outlining or summarizing the underlying data records) but omit from the visualization any data related the blocked semantic context information. As also described above, if the computing device received a selection of semantic context information to selectively filter, then the computing device may present a visualization that displays data related to the underlying data records that have been assigned to nodes and links of the semantic network, where such data may be in the form of a data table, graph, or some other format outlining or summarizing the underlying data records), including in this visualization only data related to the one or more nodes and/or properties that have been selected for the filter and exclude from the visualization data not related to the selectively-filtered nodes. Other ways to present to the user a visualization of the semantic network implementing either or both of the blocked context information and/or the filtered context information are possible as well.

VI. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
a network interface;
at least one processor;
a non-transitory computer-readable medium; and
program instructions stored on the non-transitory computer-readable medium that are executable by the at least one processor to cause the computing system to perform functions including:
receiving an indication of an instance of a semantic network, the semantic network comprising conceptual data components and associative data components;
receiving a selection of at least one data component from among the conceptual data components and associative data components, the selection comprising an indication to (i) block the selected at least one data component or (ii) selectively filter the selected at least one data component;
associating the selection of at least one data component from among the conceptual data components and associative data components with a particular user; and
based on the selection of at least one data component from among the conceptual data components and associative data components, limiting a visualization of the semantic network presented to the particular user, wherein limiting the visualization comprises (i) if the indication is to block the selected at least one data component, excluding from the visualization any data related to the selected at least one data component or (ii) if the indication is to selectively filter the selected at least one data component, including in the visualization data related to the selected at least one data component and excluding in the visualization any data not related to the selected at least one data component.

2. The computing system of claim 1, wherein the program instructions are further executable to cause the computing system to perform functions including:
  presenting to the particular user a plurality of visualizations of the semantic network; and
  based on the selection of at least one data component from among the conceptual data components and associative data components, limiting each visualization of the plurality of visualizations of the semantic network presented to the particular user.

3. The computing system of claim 1, wherein the instance of the semantic network comprises a subset of an entire semantic network.

4. The computing system of claim 3, wherein the subset of the entire semantic network comprises a subset of conceptual data components and associative data components, with one conceptual data component having been previously designated as a primary conceptual data component, and
  wherein the program instructions are further executable to cause the computing system to perform functions including receiving a selection of underlying data records assigned to the primary conceptual data component to selectively filter.

5. The computing system of claim 1, wherein the semantic network further comprises underlying data received from multiple disparate external data sources, the underlying data being assigned to one or more data components from among the conceptual data components and associative data components.

6. The computing system of claim 1, wherein the program instructions are further executable to cause the computing system to perform functions including:
  presenting, via a graphical user interface, graphical options for selecting at least one data component from among the conceptual data components and associative data components of the instance of the semantic network; and
  wherein the selection of at least one data component from among the conceptual data components and associative data components of the instance of the semantic network is received by the computing system via the graphical user interface.

7. The computing system of claim 1,
  wherein the instance of the semantic network comprises a subset of an entire semantic network,
  wherein the subset of the entire semantic network comprises a subset of conceptual data components and associative data components, with one conceptual data component having been previously designated as a primary conceptual data component,
  wherein the program instructions are further executable to cause the computing system to perform functions including receiving a selection of underlying data records assigned to the primary conceptual data component to selectively filter, and
  wherein the semantic network further comprises underlying data received from multiple disparate external data sources, the underlying data being assigned to one or more data components from among the conceptual data components and associative data components.

8. A method comprising:
  receiving an indication of an instance of a semantic network, the semantic network comprising conceptual data components and associative data components;
  receiving a selection of at least one data component from among the conceptual data components and associative data components, the selection comprising an indication to (i) block the selected at least one data component or (ii) selectively filter the selected at least one data component;
  associating the selection of at least one data component from among the conceptual data components and associative data components with a particular user; and
  based on the selection of at least one data component from among the conceptual data components and associative data components, limiting a visualization of the semantic network presented to the particular user, wherein limiting the visualization comprises (i) if the indication is to block the selected at least one data component, excluding from the visualization any data related to the selected at least one data component or (ii) if the indication is to selectively filter the selected at least one data component, including in the visualization data related to the selected at least one data component and excluding in the visualization any data not related to the selected at least one data component.

9. The method of claim 8, further comprising:
  presenting to the particular user a plurality of visualizations of the semantic network; and
  based on the selection of at least one data component from among the conceptual data components and associative data components, limiting each visualization of the plurality of visualizations of the semantic network presented to the particular user.

10. The method of claim 8, wherein the instance of the semantic network comprises a subset of an entire semantic network.

11. The method of claim 10, wherein the subset of the entire semantic network comprises a subset of conceptual data components and associative data components, with one conceptual data component having been previously designated as a primary conceptual data component, and
  wherein the method further comprises receiving a selection of underlying data records assigned to the primary conceptual data component to selectively filter.

12. The method of claim 8, wherein the semantic network further comprises underlying data received from multiple disparate external data sources, the underlying data being assigned to one or more data components from among the conceptual data components and associative data components.

13. The method of claim 8, further comprising:
  presenting, via a graphical user interface, graphical options for selecting at least one data component from among the conceptual data components and associative data components of the instance of the semantic network; and
  wherein the selection of at least one data component from among the conceptual data components and associative data components of the instance of the semantic network is received by the computing system via the graphical user interface.

14. The method of claim 8,
wherein the instance of the semantic network comprises a subset of an entire semantic network,
wherein the subset of the entire semantic network comprises a subset of conceptual data components and associative data components, with one conceptual data component having been previously designated as a primary conceptual data component,
wherein the program instructions are further executable to cause the computing system to perform functions including receiving a selection of underlying data records assigned to the primary conceptual data component to selectively filter, and
wherein the semantic network further comprises underlying data received from multiple disparate external data sources, the underlying data being assigned to one or more data components from among the conceptual data components and associative data components.

15. A non-transitory computer-readable storage medium having program instructions stored thereon that are executable to cause a computing system to:
receive an indication of an instance of a semantic network, the semantic network comprising conceptual data components and associative data components;
receive a selection of at least one data component from among the conceptual data components and associative data components, the selection comprising an indication to (i) block the selected at least one data component or (ii) selectively filter the selected at least one data component;
associate the selection of at least one data component from among the conceptual data components and associative data components with a particular user; and
based on the selection of at least one data component from among the conceptual data components and associative data components, limit a visualization of the semantic network presented to the particular user, wherein limiting the visualization comprises (i) if the indication is to block the selected at least one data component, excluding from the visualization any data related to the selected at least one data component or (ii) if the indication is to selectively filter the selected at least one data component, including in the visualization data related to the selected at least one data component and excluding in the visualization any data not related to the selected at least one data component.

16. The computer-readable storage medium of claim 15, wherein the program instructions are further executable to cause the computing system to:
presenting to the particular user a plurality of visualizations of the semantic network.

17. The computer-readable storage medium of claim 15, wherein the instance of the semantic network comprises a subset of an entire semantic network.

18. The computer-readable storage medium of claim 17, wherein the subset of the entire semantic network comprises a subset of conceptual data components and associative data components, with one conceptual data component having been previously designated as a primary conceptual data component, and
wherein the program instructions are further executable to cause the computing system to receive a selection of underlying data records assigned to the primary conceptual data component to selectively filter.

19. The computer-readable storage medium of claim 15, wherein the semantic network further comprises underlying data received from multiple disparate external data sources, the underlying data being assigned to one or more data components from among the conceptual data components and associative data components.

20. The computer-readable storage medium of claim 15, wherein the program instructions are further executable to cause the computing system to:
present, via a graphical user interface, graphical options for selecting at least one data component from among the conceptual data components and associative data components of the instance of the semantic network,
wherein the selection of at least one data component from among the conceptual data components and associative data components of the instance of the semantic network is received by the computing system via the graphical user interface.

\* \* \* \* \*